United States Patent
Harrington et al.

(10) Patent No.: US 6,289,012 B1
(45) Date of Patent: Sep. 11, 2001

(54) HIGH CONCURRENCY DATA DOWNLOAD APPARATUS AND METHOD

(75) Inventors: Robert J. Harrington; Bradley J. Hlista; Charles A. Wiley, all of Austin, TX (US)

(73) Assignee: Instanton Corporation, Austin, TX (US)

( * ) Notice: Subject to any disclaimer, the term of this patent is extended or adjusted under 35 U.S.C. 154(b) by 0 days.

(21) Appl. No.: 09/128,328

(22) Filed: Aug. 3, 1998

(51) Int. Cl.[7] .................................................. H04L 12/28
(52) U.S. Cl. ............................................. 370/389; 370/473
(58) Field of Search .................................. 370/473, 389, 370/390

(56) References Cited

U.S. PATENT DOCUMENTS

| | | |
|---|---|---|
| 4,493,021 | 1/1985 | Agrawal et al. . |
| 4,554,656 | 11/1985 | Budrikis et al. . |
| 4,759,015 | 7/1988 | Takai et al. . |
| 4,888,767 | 12/1989 | Furuva et al. . |
| 4,914,654 | 4/1990 | Matsuda et al. . |
| 4,937,819 | 6/1990 | King . |
| 5,296,936 | 3/1994 | Pittas et al. . |
| 5,307,490 | 4/1994 | Davidson et al. . |
| 5,475,817 | 12/1995 | Waldo et al. . |
| 5,491,800 | 2/1996 | Goldsmith et al. . |
| 5,553,083 | 9/1996 | Miller . |
| 5,560,003 | 9/1996 | Nilsen et al. . |
| 5,566,302 | 10/1996 | Khalidi et al. . |
| 5,572,678 | 11/1996 | Homma et al. . |
| 5,619,710 | 4/1997 | Travis, Jr. et al. . |
| 5,675,796 | 10/1997 | Hodges et al. . |
| 5,689,709 | 11/1997 | Corbett et al. . |
| 5,692,157 | 11/1997 | Williams . |
| 5,727,002 | 3/1998 | Miller et al. . |
| 5,887,275 | 3/1999 | Nguyen et al. . |
| 5,923,877 | 7/1999 | Berner et al. . |
| 5,963,551 | * 10/1999 | Minko .................................. 370/473 |
| 5,966,702 | 10/1999 | Fresko et al. . |
| 6,057,886 | * 5/2000 | Van Gestel .......................... 370/473 |

FOREIGN PATENT DOCUMENTS

| | | |
|---|---|---|
| 0 303 830 A2 | 2/1989 | (EP) . |
| 0 437 072 A1 | 7/1991 | (EP) . |
| 0 552 794 A2 | 7/1993 | (EP) . |
| 91/13503 | 9/1991 | (WO) . |
| 92/26088 | 9/1995 | (WO) . |

OTHER PUBLICATIONS

Cho, Y.J., "Continuous Multidestination ARQ Schemes for High Error–Rate Channels," Electronic Letters, vol. 24 (No. 11), p. 694–695, (May 26, 1988).

(List continued on next page.)

*Primary Examiner*—Salvatore Cangialosi
(74) *Attorney, Agent, or Firm*—Munsch Hardt Kopf & Harr, P.C.; Marc A. Hubbard

(57) ABSTRACT

A method and apparatus for downloading large items packages the item as a plurality of packets and numbers each packet with an index stored in a header. For each user to whom an item is to be downloaded, a list of packets to be sent to the user is maintained. A send process loops through each user. In any given loop, one or more packets from the list is sent to the user. These packets are then marked as having been sent on that user's list. Only one download buffer for storing the download packets and only one network communications buffer for use by a network and a connectionless transport service is required to send the packets to a plurality of users on demand. Each user indicates which packets it did not receive and those packets are added back to that user's list for sending.

26 Claims, 18 Drawing Sheets

OTHER PUBLICATIONS

Chung, P. Emerald, Et Al., "DCOM and CORBA Side by Side, Step by Step, and Layer by Layer," p. 1–19, (Sep. 3, 1997).

Comer, Douglas E., "Internetworking with TCP/IP—Principles, Protocols, and Architecture", vol. 1, 2nd Edition, Purdue University, West Lafayette, IN, p. 377–390, (1991).

Deering, S., "Host Extensions for IP Multicasting," p. 1–17, (Aug. 14, 1989).

Doshi, Bharat T., Et Al., "Error and Flow Control Performance of a High Speed Protocol," IEEE Transactions on Communications, vol. 41 (No. 5), p. 707–720, (May 14, 1993).

Edventure Holdings, Inc., "The Internet Multicasting Service: Ted Turner, watch out!," RELese 1.0, vol. 94 (No.2), p. 10–16, (Feb. 18, 1994).

Edwards, Jeri, "Let's Get Serious about Distributed Objects!," Distributed Computing, p. 1–3, (Jan. 14, 1998).

Guerraoui, Rachid, Et Al., "00 Distributed Programming Is Not Distributed 00 Programming," Communications of the ADM, vol. 42(No. 4), p. 101–104, (Apr. 14, 1999).

Henriksen, Eva, Et Al., "A Transport Protocol Supporting Multicast File Transfer Over Satellite Links," Telecommunications, 1989, p. 0590–0596, (Jun. 14, 1989).

Kessler, Gary C., "An Overview of TCP/IP Protocols and the Internet", Updated version of originally submitted paper to the InterNIC on Aug. 5, 1994, p. 1–13 (Apr. 6, 1998).

Paul, Sanjoy, Et Al., "Multicast Transport Protocols for High Speed Networks," 1994 International Conference on Network Protocols, IEEE Computer Society Press (Los Alamitos, CA), p. 4–14, (Oct. 25, 1994).

Quernheim U., Et Al., "A New ARQ–Scheme for Multicast Satellite Communications," European Conference on Satellite Communications, p. 11–15, (Nov. 1, 1993).

Sabnani, Krishan, Et Al., "Multidestination Protocols for Satellite Broadcast Channels," IEEE Transactions on Communications, vol. 33 (No. 3), p. 232–240, (Mar. 19, 1985).

Schmidt, Douglas C., "Measuring the Performance of Object–Oriented Components of High–Speed Network Programming," Presentation, Washington University (St. Louis, MO), p. 1–50. (1995).

Schmidt, Douglas C., Et Al., "Object–Oriented Components for High–Speed Network Programming," Paper, 1st ed., Washington University (St. Louis, MO), 6/95 p. 1–20.

Schmidt, Douglas C., "Object–Oriented Network Programming / An Overview of CORBA," Presentation, Washington University (St. Louis, MO), p. 1–65. (1995).

Schmidt, Douglas C., "Object–Oriented Network Programming / Writing CORBA Applications," Presentation, Washington University (St. Louis, MO), p. 1–22. (1995).

Shacham, Nachum, "Multipoint Communication by Hierarchically Encoded Data," Infocom '92, IEEE/IEE Publications Ondisc, p. 2107–2114, 1992.

Shacham, Nachum, "Multicast Routing of Hierarchical Data," Supercomm/ICC '92 : Discovering a New World of Communications, IEEE/IEE Publications Ondisc, p. 1217–1221, (Jun. 14, 1992).

Thomas, Anne, Et Al., "Java Platform for the Enterprise / Enterprise Application Development in Java," Distributed Computing Monitor, Patricia Seybold Group (Boston, MA), vol. 13 (No. 5), p. 1–19, (Jun. 14, 1998).

Thomas, Anne, "Java Application Servers / Eval ation riteria," Distributed Computer Monitor, Patricia Seybold Group (Boston, MA), vol. 13 (No. 6), p. 1–15, (Jun. 14, 1998).

Triview Manager, "Centralized Administration of Remote UNIX Systems," Tactix, p. 1–4. (1993.

Wang, Jonathan L., "Optimal Adaptive Multireceiver ARQ Protocols," IEEE Transactions on Communications, p. 1816–1829, (Dec. 14, 1993).

Walters, A. G., Et Al., "Broadcast File Distribution Protocols for Satellite Networks", University of Essex, UK, p. 133–138.

World Wide Web, "http://www.infosys.tuwien.ac.at/Research/Corba/OMG/cover.htm," The Common Object Broker: Architecture and Specification, p. 1–57, (Mar. 15, 1998).

World Wide Web, http://www.qds.com/people/apope/Corba/ap_object.html, "Object Basics", 19 pages, (Mar. 15, 1998).

World Wide Web, "http://siesta.cs.wustl.edu/~schmidt/corba–research–performance.html," Research on High–performance CORBA, p. 1–4, (Nov. 16, 1999).

* cited by examiner (Go to client download process)

HIGH CONCURRENCY DATA DOWNLOAD APPARATUS AND METHOD

FIELD OF INVENTION

The invention pertains generally to downloading large data items in packets across communication systems, and in particular to downloading concurrently a large data item to a plurality of users on demand.

BACKGROUND OF THE INVENTION

Networking is leading to increasing demand for distributed computing, particularly "client-server" style, in which one software entity—the "client"—requests a service from another software entity—the "server." One such service is access to a file stored on or available to the server. This access may take one of several forms. One such form, for example, is a request by a client for data in a file managed by a database located on a server. The server retrieves the data from the database and sends it to the client. In another form, on-line, shared access, a client application may access files stored by a server's file system in the same manner it accesses its local file system. Another form is file transfer, where an entire file is transferred. Although this transparent access to a remote file may be desirable in some applications, it is often difficult to implement, especially in a network or between networks composed of heterogeneous computers. Furthermore, networks are often congested or overloaded, with the unavailability of remote files potentially creating any number of problems. Therefore, it is often preferable to transfer an entire file in situations where on-line file sharing may otherwise be desirable. With file transfer, an entire program, data file or other large item can be transferred to a client for immediate or long-term use.

Protocols developed for the Internet and its predecessor packet-switched data networks are increasingly being relied upon for communication not only between interconnected networks of differing media, but also on local and wide area networks. These include various protocols for transferring files. The primary communication and file transfer protocols are the Internet Protocol (IP), the Transmission Control Protocol (TCP), HyperText Transmission Protocol (HTTP) and the File Transfer Protocol (FTP).

The IP protocol is used in the transmission of data from a source host computer (or, simply, "host") to a destination. It is a connectionless, or datagram, service that provides for addressing independently of the underlying network medium. It does not provide end-to-end communication services. Rather, it is up to implementations of the TCP protocol to do so. TCP is a connection-oriented transport service that provides end-to-end reliability, packet sequencing and packet flow control. FTP and HTTP are application layer services that rely on the underlying TCP/IP processes. FTP, for example, sets up and manages the data connection over which a file is transferred, as well as handling any data transformations that are necessary. HTTP performs many similar services.

More particularly, a TCP session provides reliability and flow control in the transmission of the data in the file. Data that flows in a TCP connection may be thought of as a stream of octets. A sending TCP implementation is allowed to collect data from the sending user and to send that data in segments at its own convenience, until the user signals a "push" function. Then, it must send all unsent data. A stream of data sent on a TCP connection is delivered reliably and in order at the destination. Transmission is made reliable by use of sequence numbers and acknowledgments. Conceptually, each octet of data is assigned a sequence number. The sequence number of the first octet of data in a segment is transmitted with that segment and is called the segment sequence number. Segments also carry an acknowledgment number, which is the sequence number of the next expected octet of data transmitted in the reverse direction. When the TCP transmits a segment containing data, it puts a copy on a retransmission queue and starts a timer. When the acknowledgment for that data is received, the segment is deleted from the queue. If the acknowledgment is not received before the timer runs out, the segment is retransmitted.

One problem with using FTP and HTTP is that a TCP requires significant resource overhead. Thus, on a server maintaining multiple user connections, significant resources are consumed, causing the server to run slowly, to be unable to make new connections, or to crash. In order to implement TCP, each user connection must have a separate TCP buffer.

For example, as shown in FIG. 1, if there are three users, a file transfer application at application layer 101, such as one implementing FTP, will prepare three different copies of an item 103 to be downloaded. The copies are designated as 103a, 103b and 103c, for users 1, 2 and 3, respectively. The application reads each of these copies into a separate TCP buffer for the user, which are referenced as 105a, 105b and 105c, respectively. A TCP implementation runs at TCP layer 107. In a network layer 109, the TCP implementation copies packets of data, in some predetermined order, from the buffers 105a, 105b and 105c to a buffer 111 of a network communications card, which transmits the packets over the network.

Referring now to FIG. 2, some wasted memory can be reclaimed at the application layer 101 by caching a single copy of the item to be downloaded and copying it to each of the TCP buffers 105a, 105b and 105c. Furthermore, although not shown in FIGS. 1 or 2, FTP requires both a control connection and a data transfer connection for each user, thus doubling the number of memory buffers.

Referring to FIG. 3, where multiple users have requested the same download item and the download to all the users can be scheduled for the same time, a multicast capable network can be made use of. In this case, the file transfer application at layer 101 makes use of a network communications system implementing the User Datagram Protocol (UDP) and multicasting protocol. UDP is a connectionless transport layer protocol. It is up to the application making use of a UDP implementation to deal directly with end-to-end communication problems such as packetization and reassembly, flow control and retransmission for reliable delivery. One disadvantage of this method is that the network must be multicast-enabled. Thus, it is up to the application to deliver packets containing data from download item 103 to the network buffer 111. The Internet, however, is not fully multicast-enabled at this time. Another disadvantage is that a file transfer application relying on network multicasting cannot provide a download when demanded by only a single user, or carry out downloads of the same item to multiple users commenced at different times. In other words, multicasts must be scheduled. Scheduling is not practical or desirable in many high concurrency environments and applications.

Despite the reliability promised by TCP/IP, file downloads handled by implementations of FTP and HTTP tend to hang up when packets are lost in transmission, particularly when a server is heavily burdened with a large number of downloads. This tendency is due to the nature of TCP's process for handling missing packets. When the connection between a client or the server "time outs" due to network transmission failures, both the client and the server must go through a procedure to restart the transmission at the point where the connection times out. This restarting process provides greater opportunity for the download application to hang up when the server is already heavily burdened with multiple downloads. Furthermore, should the connection be lost in the middle of a download, resuming the download in a new connection requires identification of the last byte actually received. Although some implementations of HTTP have "recover" or "resume" features that enable resumption of an interrupted download, HTTP does not allow for a mirrored server to resume the download if the original server is down or not available.

SUMMARY OF THE INVENTION

The invention has as its object an improvement in a computing system's ability, in particular a server's ability, to support greater levels of concurrency when downloading large items, especially when such items are being downloaded to users on demand. As used herein, a "large item" is one that must be transmitted over an IP network using two or more packets. A large object may have sizes ranging from around two kilobytes to over several gigabytes. Large items include files, such as text files, data files, program files, objects, and other collections of information readable by a computer. In a distributed computing environment or communications network, the invention enables providing a download service that is more scalable in terms of the number of concurrent clients or users that can be supported without significant degradation in performance, and is thus better able to handle unpredictable levels of demand for service.

The invention is hereinafter described in reference to a distributed computing system in which a client requests a download service from a remote server. Several features of the system, each of which alone or in combination with one or more of the other features, achieve the objective of supporting greater concurrency and scalability, especially in computing environments distributed across different address spaces or computing platforms. According to certain features, the system is able to store an item for downloading to a plurality of users using a single memory buffer for the item. The system then transmits the item as a series of packets on demand to each of the plurality of users, without requiring that the download process for each user commence at the same time, or that the same packet be sent at the same time to each of the users. Thus, a greater number of concurrent downloads can be supported without a corresponding increase in the amount of memory that would be expected under prior art systems, and without the limitations of network multicasting. According to other features of the system, reliability is implemented in a manner that makes it less prone than prior art FTP and HTTP implementations to hang as a consequence of lost packets. Furthermore, these features enable an interrupted download to be resumed on a mirrored server, if desired.

The forgoing summary is not intended to define or limit the scope of the invention. Rather, the scope of the invention is limited only by the appended claims.

DETAILED DESCRIPTION OF PREFERRED EMBODIMENTS

In the following description, like reference numbers refer to like elements.

Figure 1:
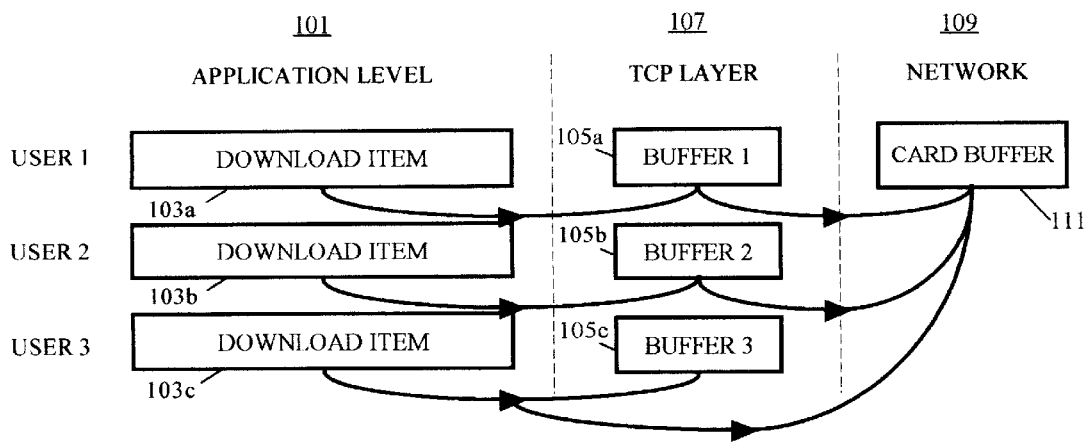
FIG. 1 is a schematic illustration of memory used by a TCP based concurrent file download process.
Figure 2:
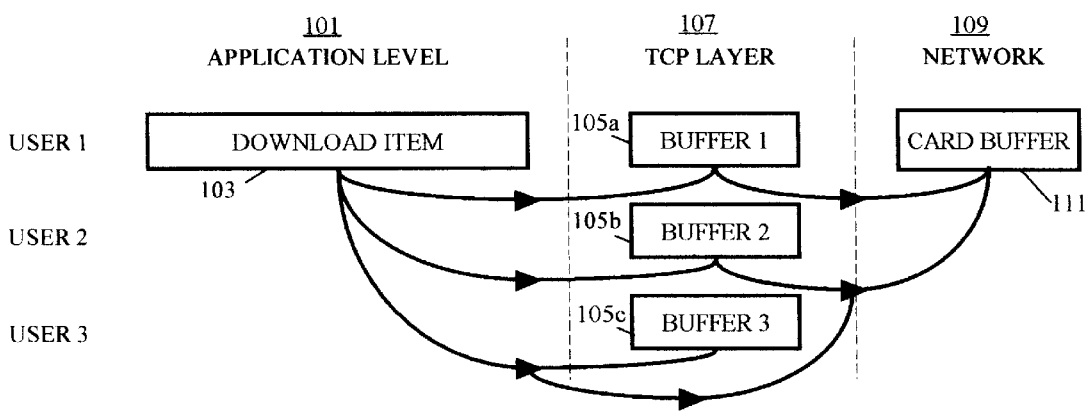
FIG. 2 is a schematic illustration of memory used by a TCP based concurrent file download process with a cache.
Figure 3:
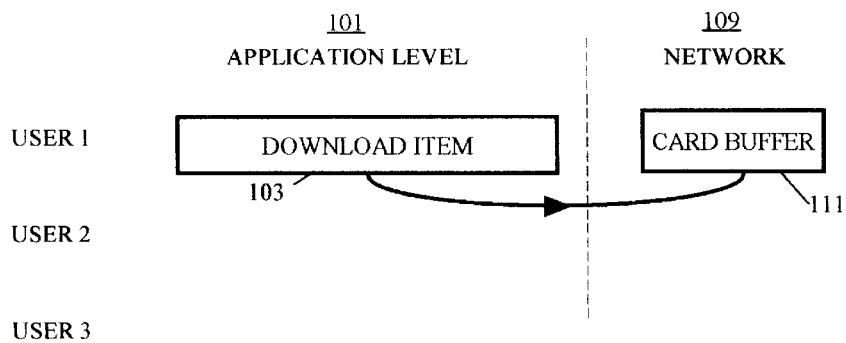
FIG. 3 is a schematic illustration of a memory used by a file download process to multiple users that utilizes network multicasting.
Figure 4:
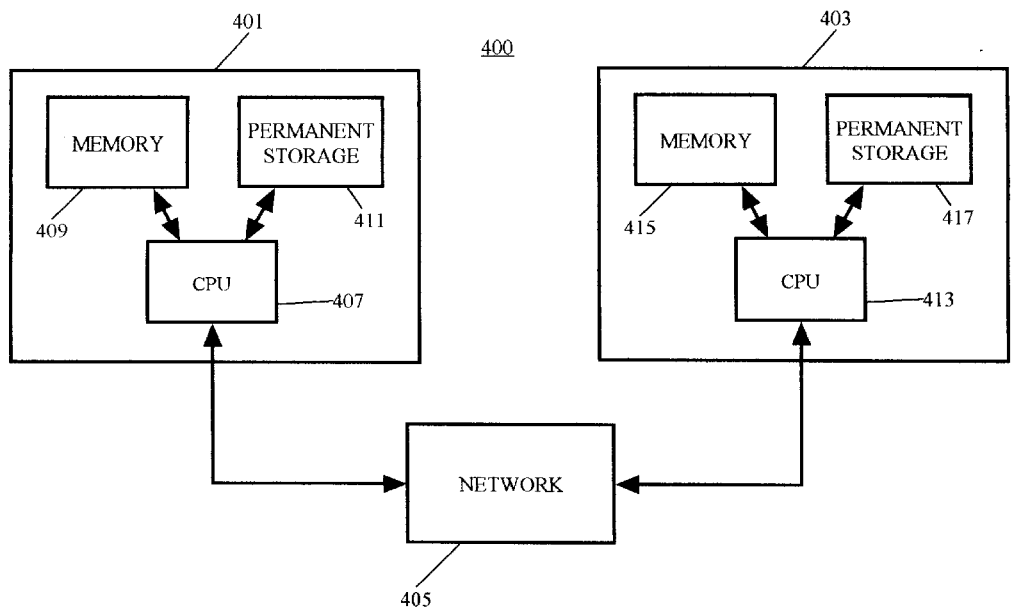
FIG. 4 is a schematic drawing of two computers communicating over a network, and is intended as a representative example of a network or distributed computing platform.

Referring to FIG. 4, representative hardware for a distributed computing system 400 includes two computers, 401 and 403 respectively, connected for communication through a network 405. Computer 401 is a general purpose computer. It includes a central processing unit (CPU) 407 for executing programming instructions, memory 409 for storing programming instructions and data during execution of software programs, and permanent storage 411 for non-volatile storage of data and programs. Similarly, computer 403 includes a CPU 413, memory 415 and permanent storage 417. All of the components and processes described herein are preferably implemented as software, i.e. stored programming instructions read from a storage medium and executed by the CPU 407 and/or 413.

Figure 5:
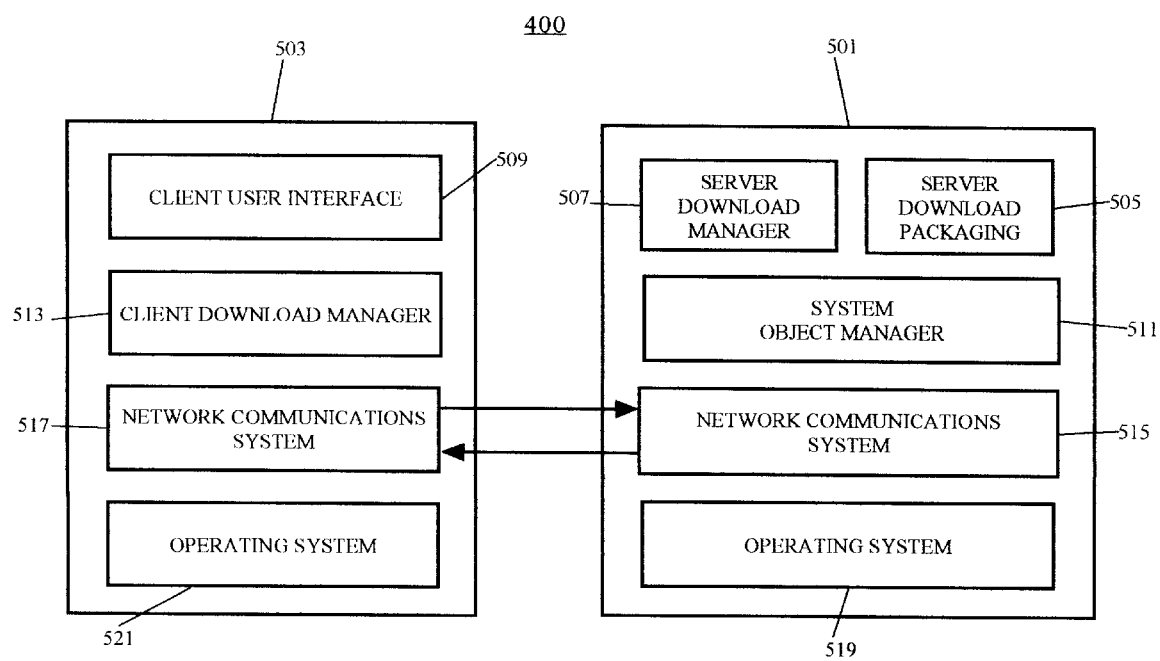
FIG. 5 is a schematic drawing of the software components of a file download system running on a distributed computing network, as represented by a client computer and a server computer, such as those of FIG. 4.

FIG. 5 is a schematic illustration of the basic, functional components of download and object management processes operating within distributed computing system 400. These components, and their operation, will be illustrated in reference to a "server" computer 501, which can take the form of computer 403 (FIG. 4) and a "client" computer 503, which can take the form of computer 401 (FIG. 4). The designations "server" and "client" refer to the fact that a computing entity (e.g. a process, an object, or a collection of processes or objects) running on computer 501, such as a high concurrency download system comprised of server download packaging component 505 and server download manager 507, is providing services to a computing entity running on computer 503, such as client user interface 509 and download manager 513. However, any given computer may have applications that function as "servers" and "clients," or one application that is both requesting services from a remote server, and providing services to a remote client. "Server," as used herein, will therefore refer to a computer process or entity that provides a service. "Client" will refer to a computer process or entity that requests a service. As a server and a client frequently reside on separate computers, the respective computers are sometimes also referred to as a "server" and a "client." However, a server and client could also reside on the same computer or computing machine—for example, one that has multiple processors, or processes running in different address spaces. A "user" refers to the consumer of a service. The terms client and user are sometimes used herein synonymously when describing the download processes on the client. However, a client can provide download services to more than one user. Finally, though the system is explained in reference to one client running on a remote computer, the system is intended to support many users concurrently requesting services of a server.

The client and server computer systems include operating system 521 and operating system 519, respectively. The server's operating system preferably supports multithreading in applications. However, no particular operating system is intended. The network communications system provides the processing necessary to move data between the client download manager 513 and the server download manager 507 across a physical communications network or networks interconnecting two computers. Most data is communicated, at a network layer, in the form of packets. These "packet-switched" networks do not typically set up a dedicated circuit between end hosts. However, other types of communications systems can be used to exchange information in the form of packets.

The implementations of the network communications systems referenced in blocks 515 and 517 are dependent, in part, on the communications media used to connect the respective computers to network 405 (FIG. 4), the types of networks to which the respective computers are connected, whether they are connected to the same networks, and other well-known considerations. In the following description, due to the widespread acceptance of the protocols, the client 503 and server 501 will each utilize a "network protocol" stack implementing the Internet Protocol (IP) and the User Datagram Protocol (UDP), as well as the well-known standard "sockets" protocol. The connection-less UDP transport protocol requires less processing overhead than the more popular TCP transport protocol. Furthermore, as will be described, reliability achieved through the connectiontype services offered by the TCP can be achieved instead in a more efficient manner in a high concurrency environment by a download system that comprises client download manager 513, server download manager 507 and server download packaging component 505, and a connectionless transport service using a protocol such as UDP. However, process of the client and server download managers could, if desired or necessary, be adapted to work with a connection-oriented transport service.

The client download manager 513 can be implemented in a number of ways. For example, it can be implemented as part of a web browser or a plug in component to a web browser. It could also be sent as a remotely executed program, such as a Java applet that runs on a Java virtual machine. Furthermore, it could be a component of a network communications system or an operating system. Similarly, the server download manager 507 and download packaging component 505 can be implemented as part of a web server or other applications that download substantial amounts of information. They could also be integrated into, or implemented as part of, an operating system or a network communications system.

Figure 6:
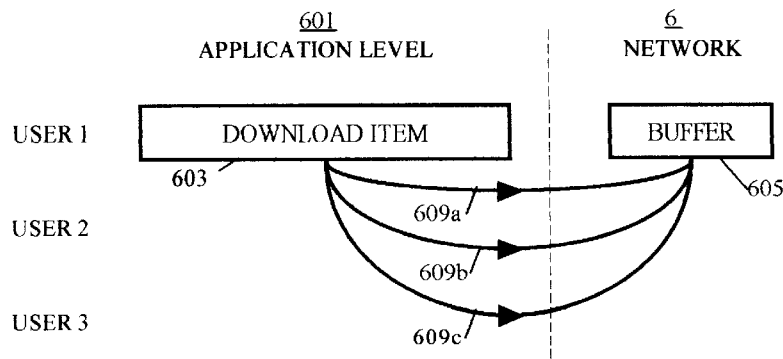
FIG. 6 is a schematic illustration of a download process.
Figure 7:
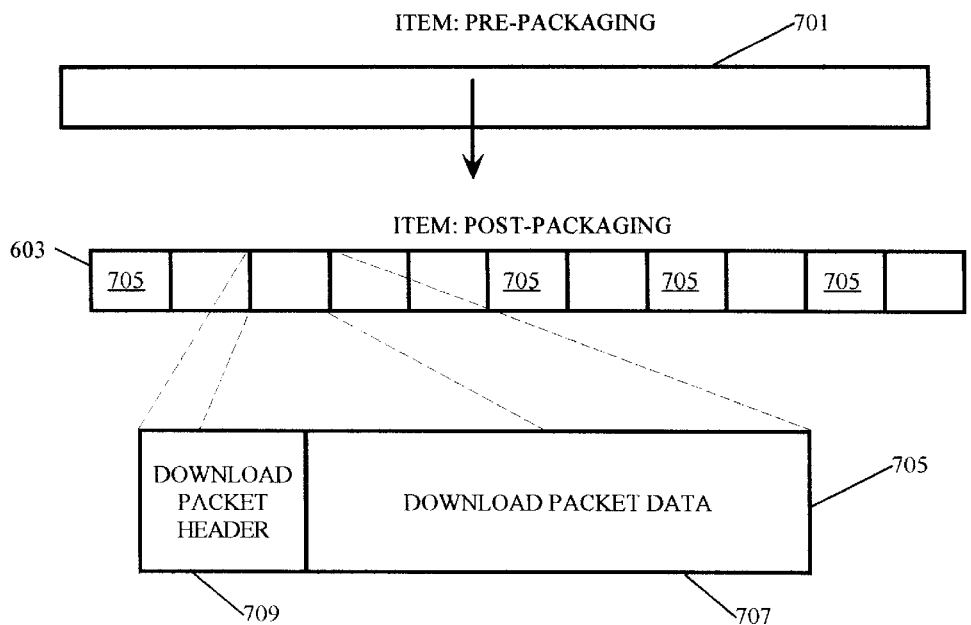
FIG. 7 is a schematic illustration of a download packaging process of dividing an item for downloading into packets and placing a download header on each packet.
Figure 8:
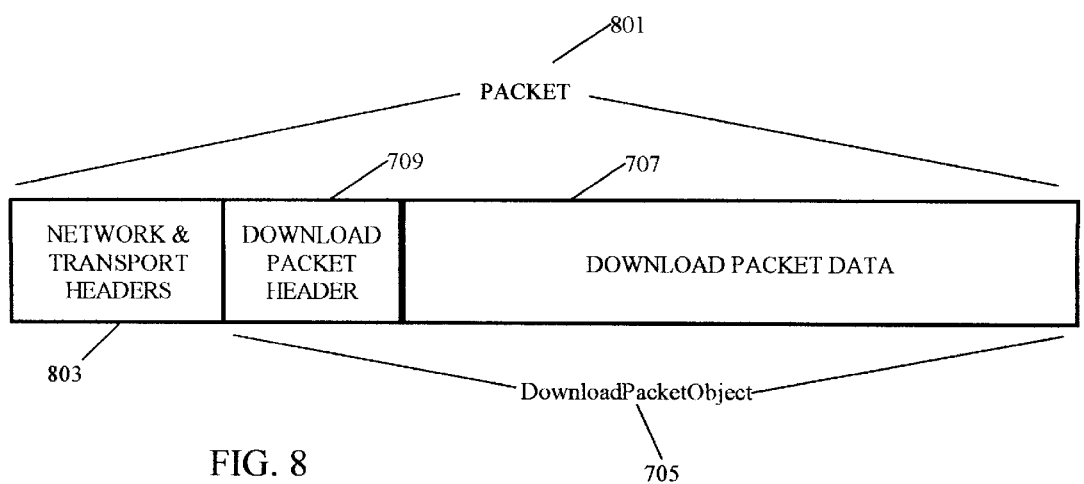
FIG. 8 is a schematic illustration of encapsulating the data packet of FIG. 7 with a network communications header.

Referring now to FIGS. 6, 7 and 8, the download processes of the server download manager 507 (FIG. 5) and the server download packaging component 505 (FIG. 5) are summarized. Both the download manager and the packaging component are application layer 601 programs. The download manager controls, among other things, download of a prepackaged download item 603 using a single network communications buffer 605 under control of network communications system 515 (FIG. 5). The network communications system operates at the network level 607.

Server download packaging component 505 (FIG. 5) divides up or segments, and then packages the download item as two or more packets 705. The download item is represented in its native form by block 603. Each packet 705 includes a segment 707 of the download item, which is referred to herein simply as "data," and a download header 709. The term "data" is used herein as a generic designation for information in a computer readable form. The download manager 507 uses the download packet header 709 for reliability and other purposes during a download process. As will be discussed below, each download packet 705 is preferably treated as an object that is managed by system object manager 511 (FIG. 5).

Each data flow line 609a, 609b and 609c represents a separate sending process for concurrent users 1, 2 and 3, respectively. During the sending process for any one of the users, one or more of the packets 705 in the packaged download item 603 are copied one at a time to network communications buffer 605. The network communications system then adds network and transport headers, generally represented by header 803, to create a data packet 801 that is actually transmitted on network 405 (FIG. 4). The network communications system will also add a media access header depending on the type of network to which the client is attached. Once a data packet 705 is copied to network buffer 605, it is, preferably, immediately encapsulated with the network and transport headers and transmitted to the network. In this embodiment, no flow control takes place within the network communications system. As previously mentioned the transport service of the network communications system of the embodiment is a connectionless transport service like UDP in order to reduce memory and processing resource demands by the network communications system. However, a connection-oriented transport service could be utilized to make use of any flow control services it might offer. The network communications system sets the network and transport headers using information concerning the user (for example, its internet and port address) that is provided by the download manager 507.

The download manager 507 controls the flow of data packets for each user in a time-share fashion by initiating and controlling copying of the download packets to the network communications buffer. How often it switches between users may depend on any number of factors. For example, the download manager could be set up to send a preset number of packets for a user before switching to a next user. This number could be based on an initial determination of the type of network connection the user has, or on some number that optimizes performance of the server, or both. However, as will be further discussed below, the download manager 507 could, if desired, provide at this point flow control services for the end-to-end communication. Flow of packets can be affected by, among other things, network conditions and the ability of a client or user's host machine to receive the data packets. In some circumstances, flow control may not be needed, or default packet transmission rate settings can be employed. Thus, in addition to the number of download users and system resources, the download manager's switching between users could, if desired, also be based at least in part on network flow control objectives, which advantageously allows the network communication system to utilize a connectionless transport service.

One important benefit of the foregoing download methods is that different packets can be sent to multiple users concurrently without requiring that multiple copies of the download item be made or multiple network buffers be maintained. Concurrent downloading of the same item to multiple users can occur when demanded by the user, not at some prescheduled time as with network multicasting. Also, unlike network multicasting, one user's problems do not impact download times for the other users. Furthermore, since the download item is prepackaged, packets need not be copied in any particularly order. Thus, as will be discussed below, the user need not acknowledge receipt of each packet. Rather, the user is able to wait to conclusion of a transmission of all of the packets to specify which packets did not make it and need to be resent. Only these packets then need to be sent again. Thus, without having to acknowledge receipt of each packet, downloading occurs faster and imposes less processing and memory overhead on the download server when downloading concurrently to multiple users. Moreover, download items can be placed on multiple servers and packaged according to predetermined parameters, allowing a user or server to switch a download in midstream to, or to resume an interrupted download on, a different server.

Figure 9:
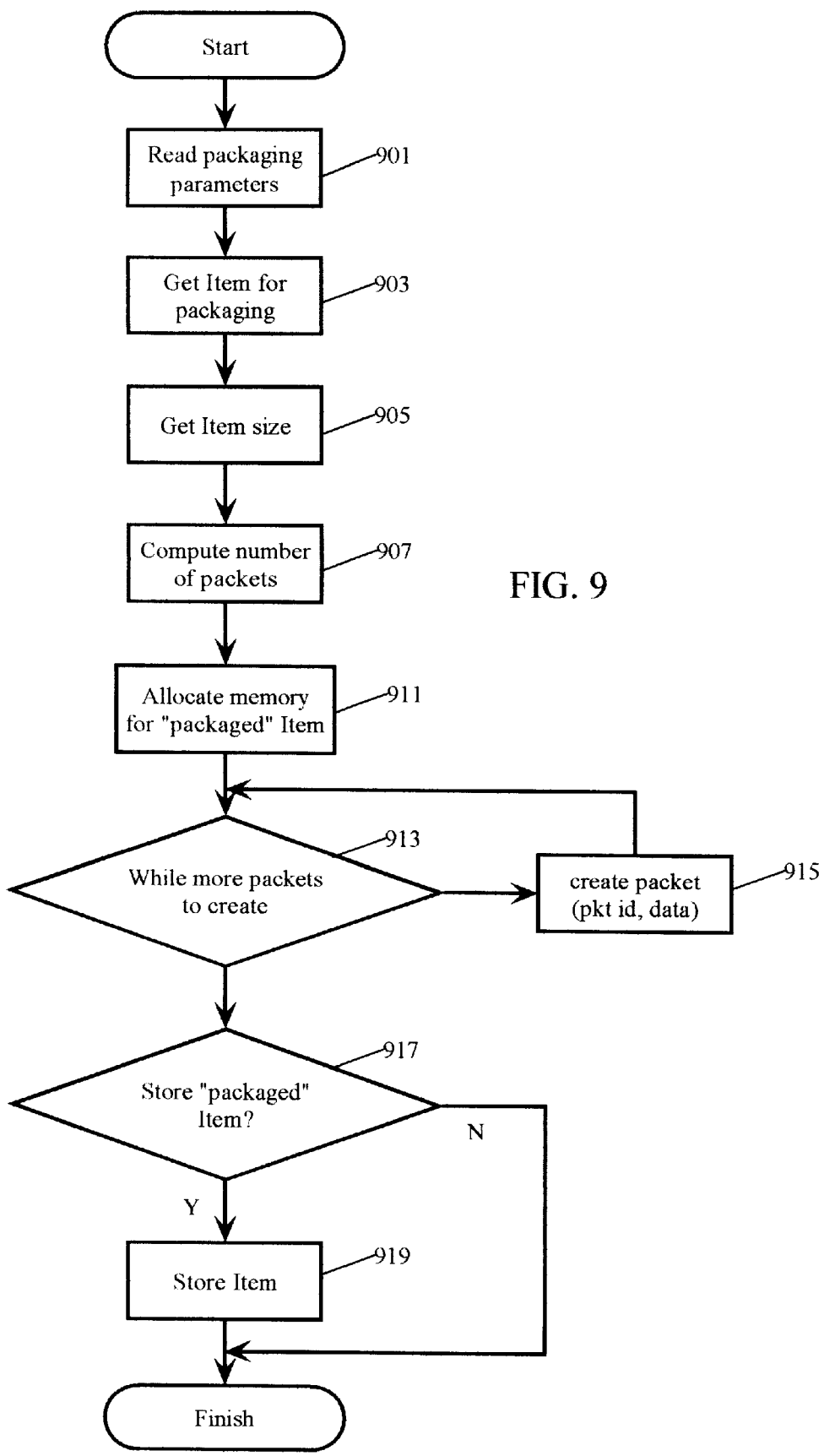
FIG. 9 is a flow diagram of a process for packaging a download item into a plurality of data packet objects.
Figures 17, 18:
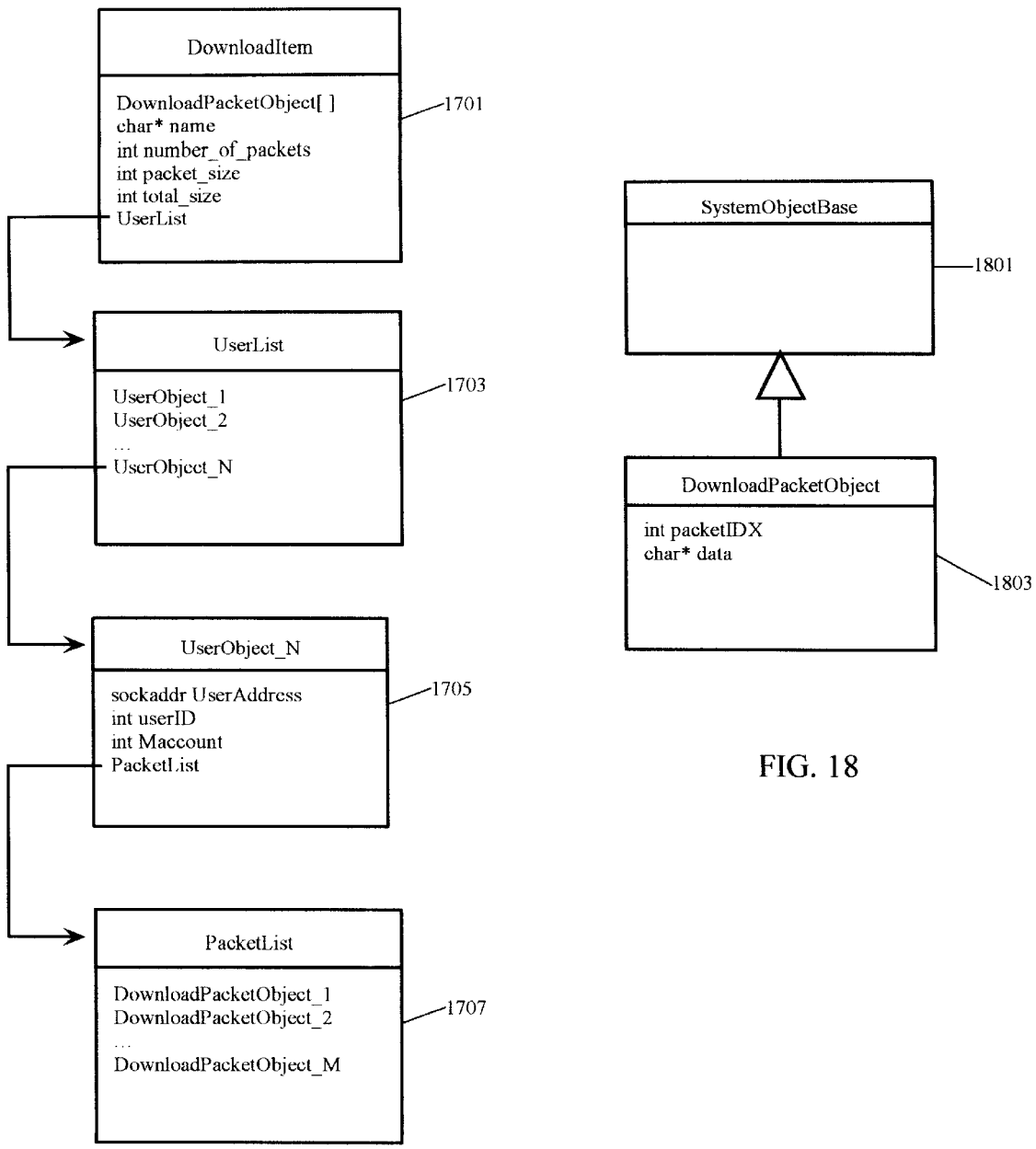
FIG. 17 is a class diagram of object classes for storing information on download packet objects comprising each download item, download service users, download information for each user, and packets to be sent to each user.
FIG. 18 is a class diagram illustrating that a download packet object class is derived from SystemObjectBase class.

FIG. 9 illustrates a process on the server that packages a download item into download packet objects 705 (FIG. 7). This packaging process, which is sometimes also referred to as "prepackaging" because it is done prior to copying the item to the network communications system, can be done for a download item in advance of a request for a download or once a request for download is received. Beginning at step 901, packaging parameters are read from a configuration file. These parameters include the number of bytes per download packet. In the preferred embodiment, this information is then stored in a data element "$packet_{13}size$" of an object that is a member of the class DownloadItem 1701 (FIG. 17). One such object is created for each item that is packaged. At step 903, the item is read from storage. The size of the item is obtained, such as from the server's file system, at step 905. This too is stored in the DownloadItem object for the item, in data element "$number_{13}of_{13}packets$." At step 907, the number of packets is computed and memory for the packaged item is allocated at step 911. As each download packet is, in a preferred embodiment, treated as an object, this allocation can make use of the SystemObject manger 511, using processes described in connection with FIG.'s 19-26. As indicated by decision step 913 and step 915, the process creates a download packet by segmenting or dividing the item into a plurality of data segments 707 (FIG. 7) and then inserting download packet header 709 (FIG. 7) to create a download packet 705 (FIG. 7). These data segments, and their respective packets, are preferably of identical size, except possibly for the last segment.

As, in a preferred embodiment, the download packet is implemented as an object, step 915 involves instantiating an object. Referring to FIG. 18, this object is an instance of DownloadPacketObject class 1803. This class can be, but need not be, a subclass of SystemObjectBase class 1801. The SystemObject manager and SystemObjectBase class are described in connection with FIGS. 19–26. The SystemObject manager provides enhanced memory allocation and management capabilities for managing objects in high concurrency environments, and thus can be used advantageously with the download system described herein. Each instance of the DownloadPacketObject class includes a data element "packetIDX", which stores an index number. This index number uniquely identifies the packet among all of the download data packets that make up the item, as well as its relative position within the item. This index comprises, at least in part, the download packet header 709 (FIG. 7). The remainder of the object is simply data from the file.

Referring back to FIG. 9, once all of the download packets are created the download packets, which are collectively referred to as the "packaged item," are stored at step 919 if, as indicated by step 917, they are not required for immediate use.

Figure 10:
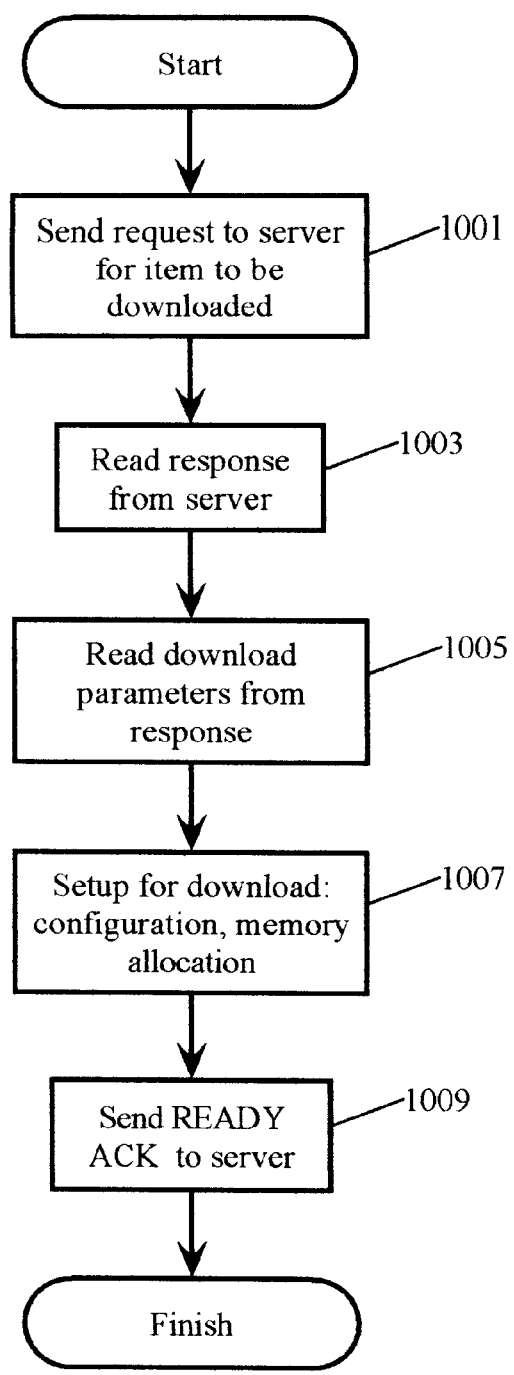
FIG. 10 is a flow diagram of a process on a client for initiating a download of an item.

Referring now to FIG. 10, should a user desire to download an item, the client 503 (FIG. 5) undertakes at step 1001 to send a request to a download server 501 (FIG. 5) identifying the item. Although not indicated, the client waits to receive a response from the server and reads it at step 1003. As more fully described in connection with FIG. 11, the server includes in its response several parameters regarding the requested download. These parameters include the number of download packets for the item, the size of each download packet and the total size of the download item. These parameters may include network communication parameters. The client reads those parameters at step 1005 and sets up for the download at step 1007 by configuring its network communications system process and allocating memory or storage for storing the incoming data packets. Once it is ready, it sends to the server an acknowledgement at step 1009 that it is ready.

Figure 11:
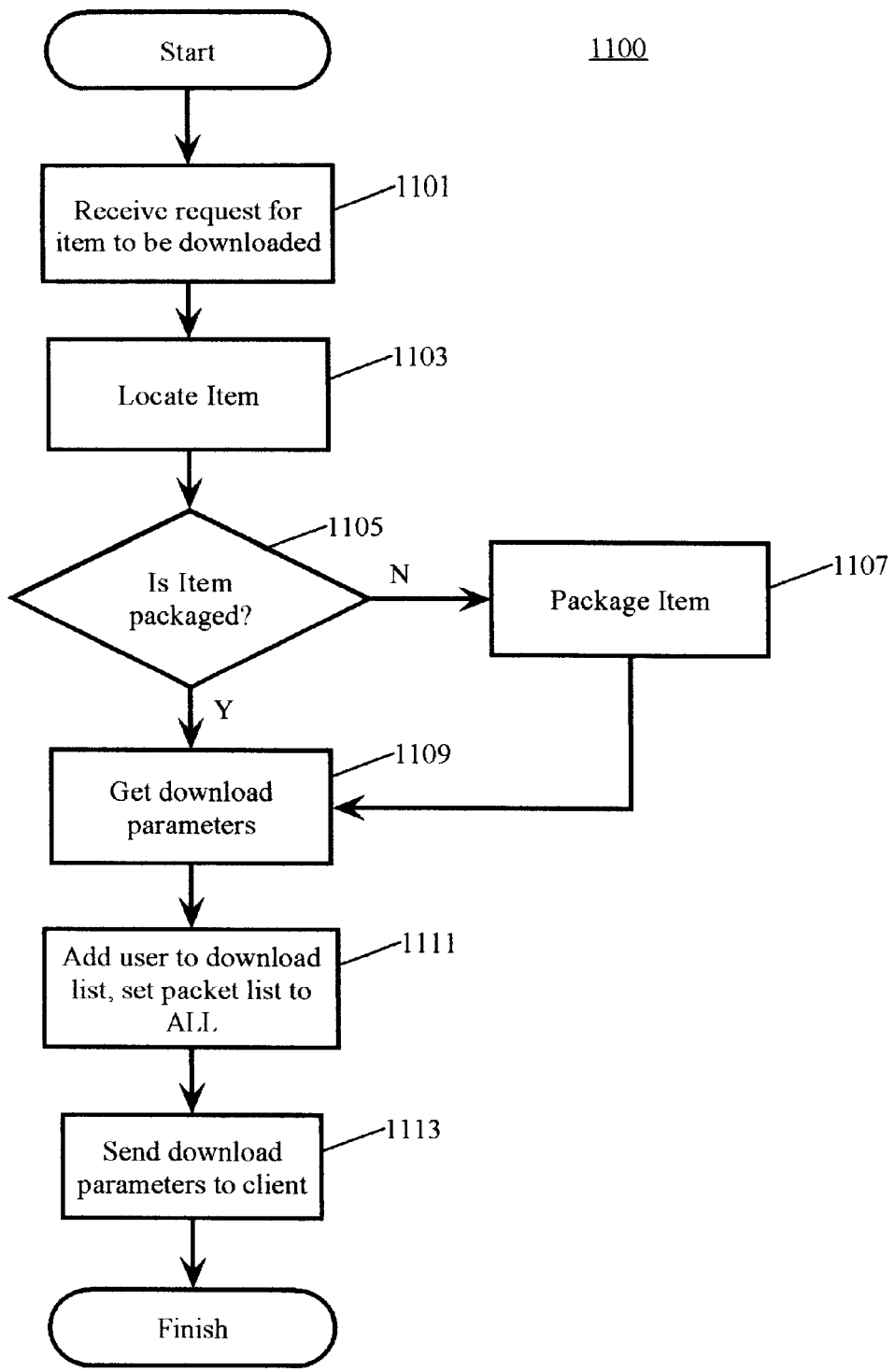
FIG. 11 is a flow diagram of a process on a download server for initiating a download of an item in response to a request from a client made during the process of FIG. 10.

Referring now to FIG. 11, illustrating server download set up process 1100, the server receives the request for a download from the client at step 1101. The request specifies the item to be downloaded. That item is located at step 1103. If it is not already packaged at step 1105, the item is packaged at step 1107 using the process described in connection with FIG. 9. If the item is packaged, or once it is packaged at step 1107, the download set up process 1100 obtains download parameters at step 1109. As previously mentioned, these parameters include the number of packets, the size of the packets and the packaged item size, in addition to other network communication related parameters. Also, as previously mentioned, these parameters are, in the preferred embodiment, stored in an object of the class DownloadItem 1701 (FIG. 17). At step 1111 the user is added to a list of users to which the server is downloading and then sets a list of download packets in the download item to be sent to the user to include all of them.

Referring briefly to FIG. 17, in the preferred embodiment an object of the class UserObject 1705 maintains details on the user, including the user's socket address ("userAddress") and some value uniquely identifying the user ("userID"). The object also stores a reference, called PacketList, to another object. This object is an instance of the class PacketList that stores a list identifying each of the download packets to be sent to the user. Since each download packet is preferably stored as an object, this object is a list of references to the objects of the DownloadPacketObject class 1803 (FIG. 18) comprising the packaged download item.

Referring back to FIG. 11, the process 1100 then sends the download parameters at step 1113 to the client.

Figure 12:
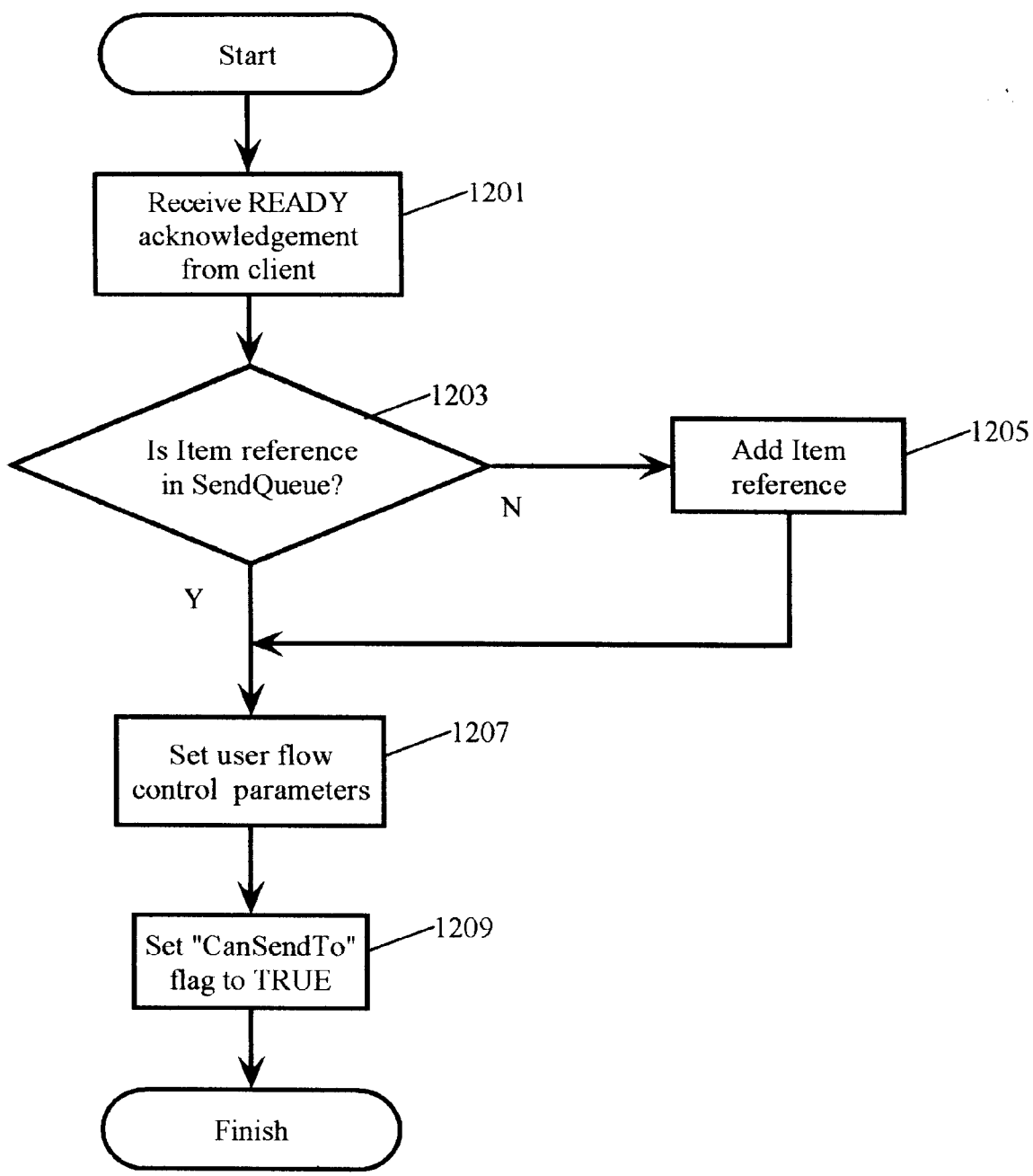
FIG. 12 is a flow diagram of a process on a download server for setting up a download on the server in response to a client acknowledging that it is ready to receive the download.

Referring now to FIG. 12, once the server receives a ready acknowledgement from the client at step 1201, a send queue is checked at step 1203 to determine whether a reference to the download item has already been added. As discussed in connection with FIG. 15, this ready acknowledgement may also be sent by the client after a reliability check process that results in missing packets having to be resent. Thus, the item may already be in the send queue. The send queue (not shown) is a list maintained by the server download manager 507 of the download items that are to be sent by the send loop process described in connection with FIG. 13. If it is already in the send queue, the process goes to step 1207. Otherwise, it adds the item's reference to the send queue at step 1205 before proceeding to step 1207. At step 1207, flow control parameters for the particular user are set. Referring briefly to FIG. 17, these parameters include the attribute "maxCount," which stores the number of consecutive download packets that should be sent to the user during loop of the send process of FIG. 13. As will be subsequently described, the send process loops through all users, and for each user, loops through a certain number of download packets, the maximum number of download packets that can be sent during any one user loop being maxCount. Referring back to FIG. 12, the set up process then sets a "can send to" flag associated with the user reference in the download list (referenced in connection with FIG. 11) to "true," meaning that the server can start transmitting download packets to the user.

Figure 13:
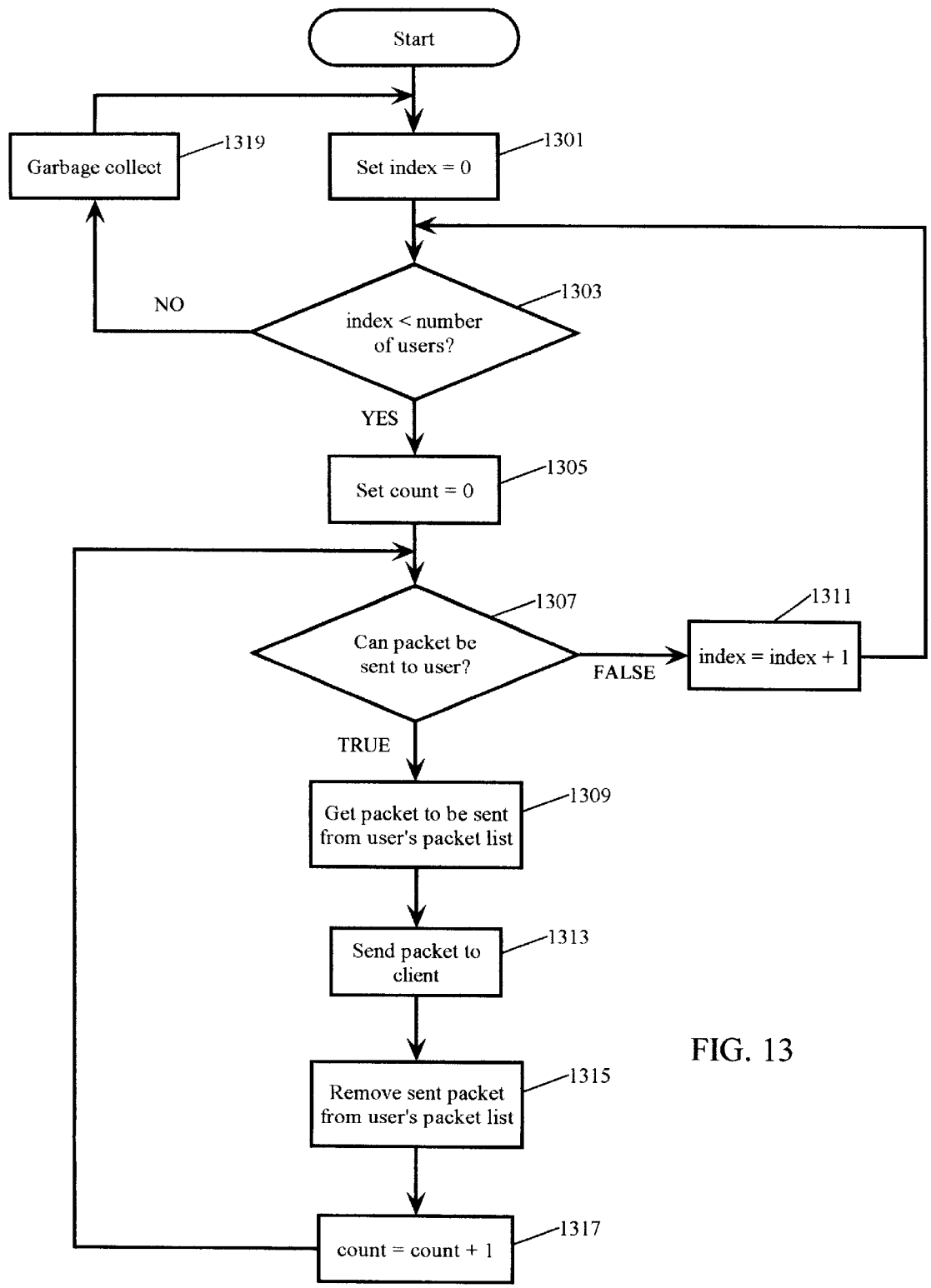
FIG. 13 is a flow diagram of a send loop process executing on a download server, which concurrently downloads items to a plurality of different users.

Referring now to FIG. 13, the flow chart illustrates the basic steps of a download send loop 1300 that continuously runs on the download server 501. An index is used to step through each user on the download list in succession and then, for each user, send some number of download packets. Starting at step 1301, the index is set equal to zero. As indicated by step 1303, for so long as the index value is less than the number of users in the download list, the process proceeds to step 1305. At step 1305, a variable "count" is set equal to zero. This variable is used to count the number of download packets sent to the user before the send loop steps to the next user. This number is equal to the number of times a process comprising steps 1309, 1313, 1315 and 1317 loops. One download packet is sent during each loop through this process.

At decision step 1307 a determination is made as to whether another download packet can or should be sent to the user. This step is where, if desired, flow control, if any, takes place. The server download manager could perform this service, or another service could be utilized. Any number of flow control algorithms and methods could be employed at this point to assist with the decision. As previously mentioned, no more than a predetermined maximum number of download packets, which number is stored is maxCount in the UserObject 1705 (FIG. 17) in the preferred embodiment, is sent for a given user during any given loop. This maxCount can be configured to be different for each user in the download list, or set the same for all users based on the number of users or some other criteria, such as the load on the server (e.g. the number of users, the size of the download items being downloaded) the resources of the server, and the resources of the client (e.g the size of its buffer). Furthermore, it can be adjusted dynamically during the download process.

If a download packet should not be sent to the user, the process loops back to step 1303, and in doing so increments the index by one at step 1311. Otherwise, at step 1309, the process gets a reference to the next download packet to be sent to the user's packet list. Each user has a list of download packets to be sent. Referring briefly to FIG. 17, in the preferred embodiment this list is an object of the class PacketList 1707. The user's object, an object of the class UserObject 1705, references the PacketList object. The PacketList object contains a listing of references to the download packets, particularly the objects of the DownloadPacketObject class that comprise the download item and that have yet to be sent to the user.

Referring back to FIG. 13, the server download manager then sends the packet at step 1313. In the illustrated embodiment, sending involves the network communications system as described in connection with FIG. 6. The reference to the sent download packet is then removed from the user's packet list at step 1315. This removal can be done any number of ways, including by setting a flag indicating that it had been sent. The count variable is then incremented at step 1317 and the process loops back to step 1307, where it is repeated until no more packets are to be sent per the determination made at step 1307.

As mentioned, this send loop is repeated for each user in the download list. Once, at step 1303, if the index is equal to or greater than the number of users in the list, the process proceeds to step 1319 for "garbage collection." Garbage collection involves removing users from the download list that have been inactive for some predetermined amount of time. This keeps a user from taking up resources if the user has lost its connection or logged off.

Figure 14:
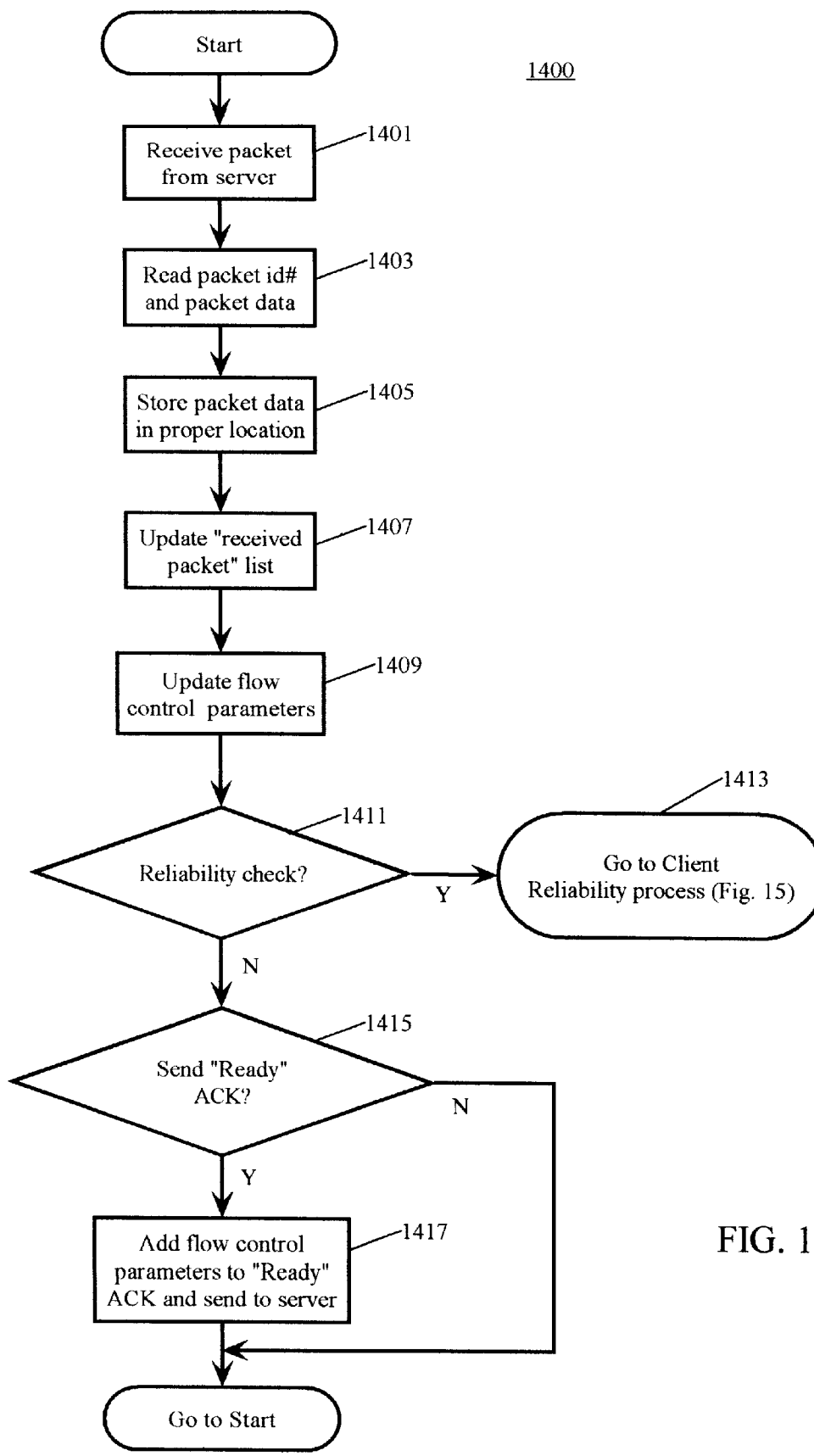
FIG. 14 is a flow diagram of a process executing on a client for receiving a downloaded item.

Turning now to FIG. 14, process 1400 illustrates the download process at the client 503. When a download packet is received from the server at step 1401, it is stored in the client's network communication's buffer. The packet ID in the download packet header is read at step 1403. The packet data can also be read at this step to perform error checking and to reassemble the download item, or it can be read at another time, for example at the end of the initial download. Based on the packet header and the configuration that took place in the process described in connection with FIG. 10, the data portion of the download packet is stored in the proper location. This location could be memory, disk or other storage media. At step 1407, the client updates a received packet list with the received packet ID. This received packet list was previously set up during the download configuration based on the download parameters received from the server.

At step 1411, the client determines whether reliability should be checked. This determination can be based on whether the last download packet has been received, whether some configurable number of packets have been received and/or whether some configurable amount of time has passed. If reliability should be checked, then the client goes at step 1413 to a reliability process illustrated in FIG. 15, where the missing packets, if any, are identified. Otherwise, it determines at step 1415 whether an acknowledgement should be sent at step 1417 to the server. The acknowledgement can be used for network flow control purposes, and need not be sent if it is not needed by a flow control service. The acknowledgement is triggered based either on some preset amount of time passing since the last acknowledgement was sent, the number of the last received packet, and/or upon the receipt of some configurable number of packets. Once the acknowledgement is sent, or if no acknowledgement is required, the process restarts with step 1401.

Figure 15:
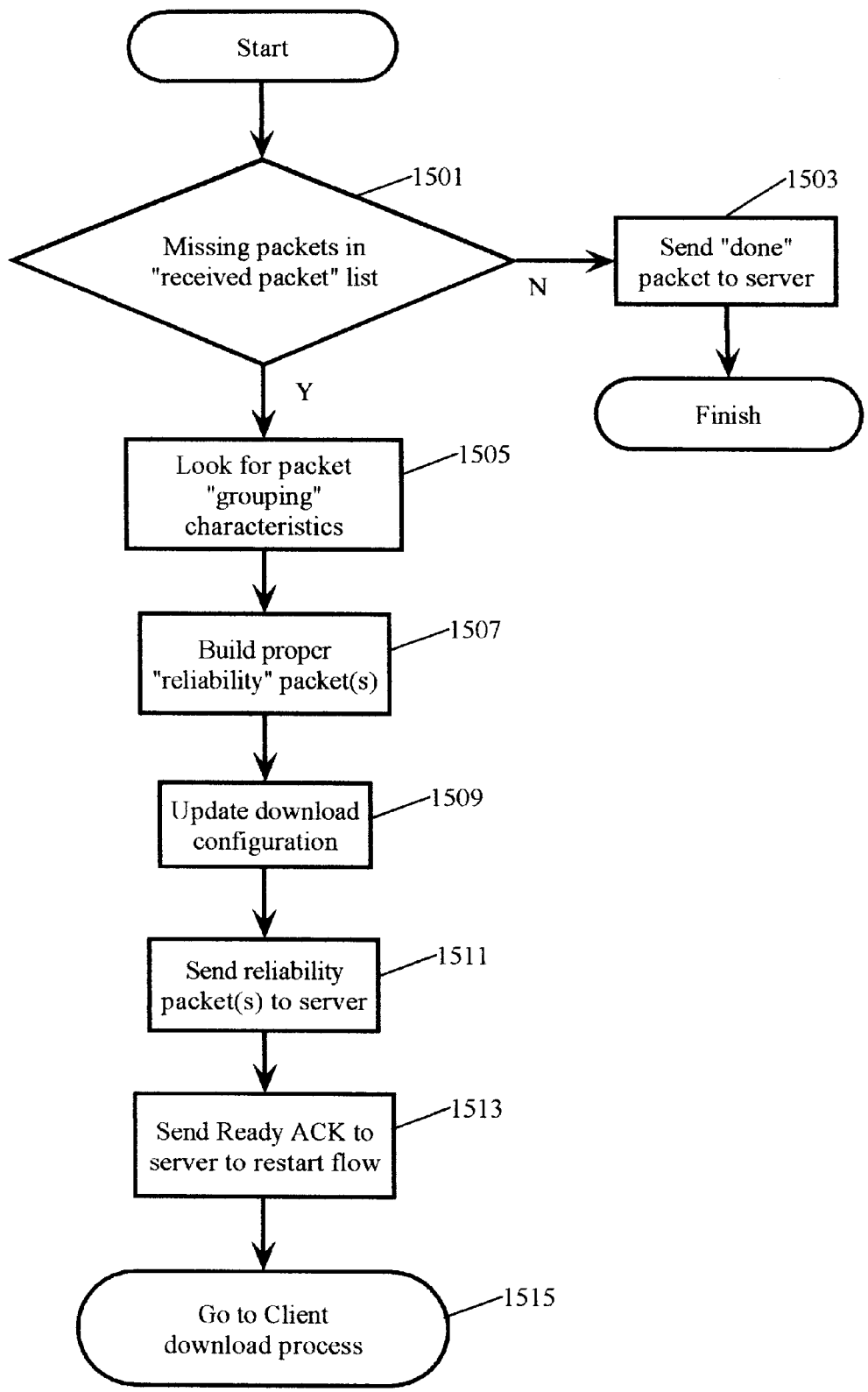
FIG. 15 is a flow diagram of a reliability process executing on a client for checking for lost packets and requesting the server to send lost packets.

Turning now to FIG. 15, which illustrates a client reliability process 1500, a determination is made at step 1501 whether there are any missing packets in the received packet list. If not, the client sends at step 1503 a message to the server that the download is finished. The process 1500 then ends. If there are missing packets, the client looks to determine whether groups of packets are missing at step 1505. For example, there may be a block of download packets missing, or packets missing from a certain point to the end of the item. Doing so reduces the size of the list of missing packets being prepared by the client, and thus speeds the processing at the client, as well as at the server once it receives the list. A reliability packet with the missing items is prepared at step 1509 and sent at step 1511. A ready acknowledgement packet is then constructed and sent at step 1513 before the client returns at step 1515 to the download process 1400 (FIG. 14). When the server receives this ready message, it executes the download setup process 1200 (FIG. 12)

Figure 16:
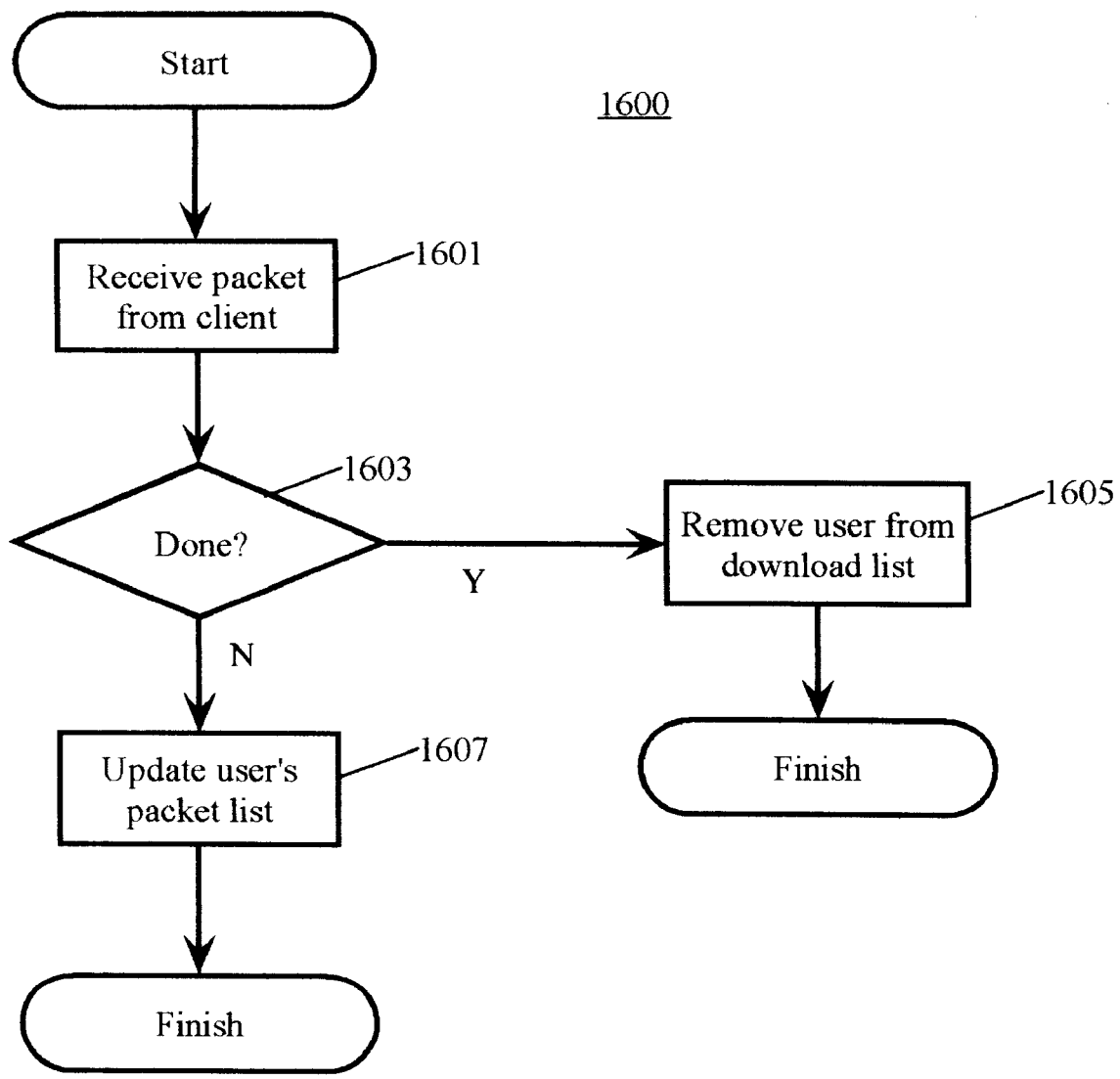
FIG. 16 is a flow diagram of a process executing on a download server for responding to a request from a user to resend packets that were lost in a download.

Referring now to FIG. 16, reliability process 1600 at the server starts with receipt of a reliability packet from the client. If, at step 1603, the reliability packet indicates that the download is complete, the user is removed at step 1605 from the server's download list and the process finishes. Otherwise, the server updates the user's packet list at step 1607 before the process is finished.

Referring now to FIG. 17, illustrated are class structures for an object-oriented implementation of the information used by the server download manager 507 (FIG. 5) to manage the server process described above. As previously described, instances of DownloadItem class 1701 maintain an array DownloadPacketObject[] that contains references to each of the download packet objects making up a particular data item. There is one instance of the DownloadItem class for each download item packaged by the server download package component 505 (FIG. 5). The download item name is stored in the "name" attribute and the number of packets is stored in the "number$_{13}$of$_{13}$packets" attribute. The size of each packet, except for the last packet, is stored in the "packet$_{13}$size" attribute. The size of the item is stored in the "total$_{13}$size" attribute. An instance of the DownloadItem class also contains a reference, UserList, to an object that contains a list of users that have requested to download the item.

The user list for a download item is maintained as an instance of UserList class 1703. Each object in the UserList class includes a reference to an object storing information on each user. The objects that store information on users are instances of UserObject class 1705. This information includes the socket address of the user, a user ID, the maximum count ("maxCount")for the user in the server download send loop of FIG. 13, and a reference to the user's send packet list. An object of the UserObject class could store additional information for security or other purposes, depending on the application. The user's send packet list is an instance of PacketList class 1707, and includes a listing of references to the download packet objects that need to be sent to the user. This list, as also other lists used by the client and server download managers, can be implemented in any number of ways. For example, it can include only references to the download packets to be sent. Alternately, for example, it can include a list of all of the download packets in the download item and an indicator of whether the item needs to be sent or has been sent.

Referring to FIG. 18, as previously mentioned, download packets are, in the preferred embodiment, treated as objects. These objects are instances of DownloadPacketObject class 1803. Because, in the preferred embodiment, these objects will be managed by SystemObject manager 511, the DownloadPacketObject class is a subclass of SystemObjectBase class 1801, which is described in more detail with reference to FIG. 20.

Referring now generally to FIGS. 19–26, the SystemObject manager 511 (FIG. 5) is described. An object, from a programming point of view, is a software entity comprising a state and a set of defined behaviors. The state is represented by the values of "attributes" maintained by the object in a defined data structure. The behaviors are specified in terms of operations the object can perform. An object is, preferably, "encapsulated," meaning that its internal structure is not available to other objects or software entities or processes. Rather, a message identifying one of its operations and any necessary parameters or arguments must be passed to the object. Thus, in effect, an object is made available only through an interface defined by the object's behavior and attributes.

In object-oriented programming methods, objects having like behaviors and attributes—in other words of the same type—are instances of a "class." The class defines what attributes an object of the class can have and its behaviors, but not its state. As actually implemented on a computer, an instance of a class, or object, is a runtime data structure, stored in memory and patterned after the class' abstract data structure. Operations of the class are implemented as executable code. The executable code for an operation is commonly referred to as a method. At run-time, the class also includes a mechanism for instantiating or creating multiple instances of itself as objects during execution. An object can invoke methods on itself, as well as on other objects, including invoking a method that creates a new object. Although, at a conceptual level, behavior and state of an object are bound together, methods are not actually stored as part of an object instance. Rather, only one set of methods is implemented for each class. When a call is made to invoke an operation on an object, the corresponding method is activated.

SystemObject manager 511 (FIG. 5) is a runtime component that functions to allocate for, and manage memory use by, objects that are instantiated using what is referred to herein as a "SystemObject." One objective of the SystemObject manager is to improve scalability and concurrency of object-oriented software through better management of memory resources. A SystemObject is a mechanism for SystemObjects manager 511 to allocate memory for an object in advance of its usage as an object, and thereafter to efficiently manage the use of the memory occupied by the SystemObject by an actual instance of an object. In a preferred embodiment, a download packet object is instantiated from a SystemObject. Each SystemObject is created within a predefined element of memory. Each memory element is preferably one of a sequence or series of contiguous memory elements that are allocated for creating SystemObjects of one or more types. In other words, a segment of addressable memory is logically divided into a plurality of elements, each element being of equal size. These sequences or series of elements are referred to herein as "lists," and detailed information defining the location of memory elements in, and information helpful in managing the memory elements for, a particular list of elements is kept in a "List" object. All objects maintaining a list of memory elements are, in the embodiment described herein, instances of this class.

Figures 20, 21:
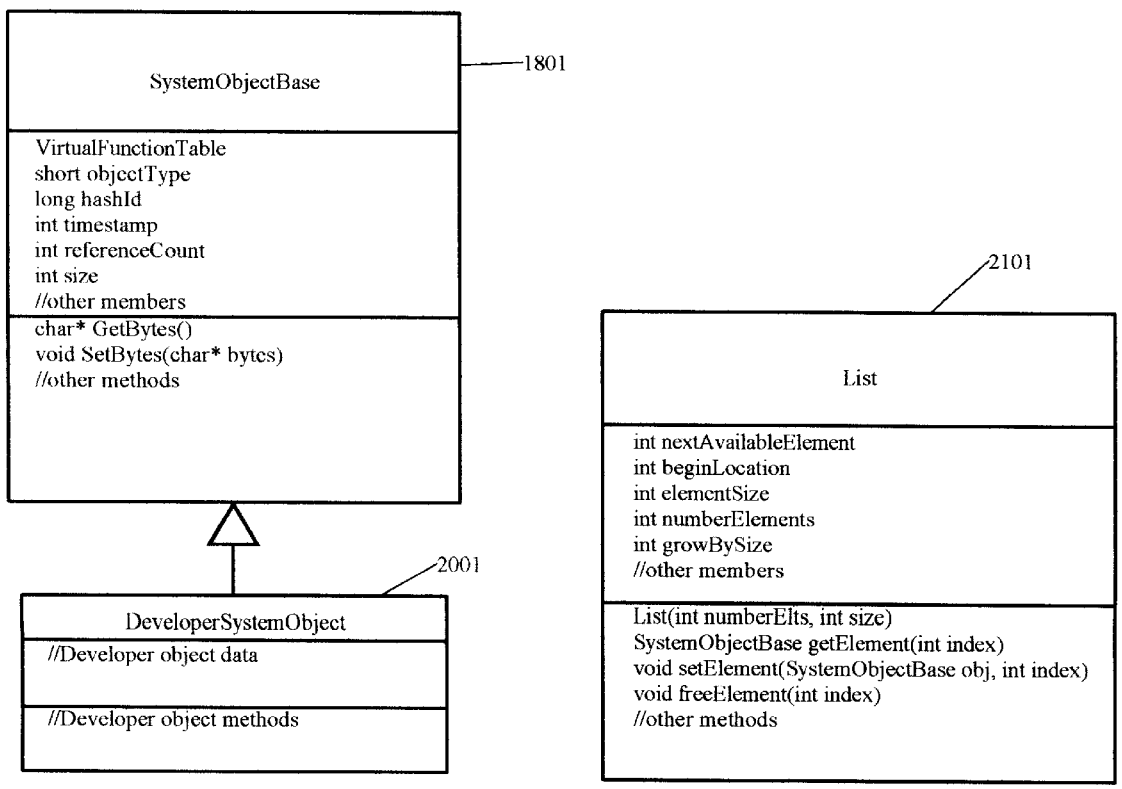
FIG. 20 is a class diagram of the SystemObjectBase and a representative subclass called DeveloperSystemObject.
FIG. 21 is a class diagram for objects called "Lists," which maintain lists of SystemObjects.

Each object to be implemented from a SystemObject preferably includes the same basic header structure, which stores basic information concerning the use of the particular memory element. The processes of the SystemObject manager use this information. The term SystemObject, in a generic sense, refers to a pre-allocated memory element in a list. The pre-allocated memory element is not technically speaking an instance of a class, though, in a preferred embodiment, it possesses a header structure for storing the same attributes as found in the SystemObjectBase class 1801 (FIG. 20). These attributes store the information used by the SystemObject manager to manage use of that memory element. Thus, a SystemObject is a unit of memory treated like an object. When a SystemObject is "used," it becomes an instance of some class, for example the DownloadPacketObject class 1803 (FIG. 18). Objects belonging to classes managed by the SystemObjects manager will also sometimes be referred to herein as SystemObject, denoting the fact that they have been created from this memory element having objectlike characteristics. In one preferred embodiment, each class of objects to be managed by the SystemObject Manager 511 is extended from a SystemObjectBase class. This ensures that the proper structure for managing the object is in place, while reducing the burden on developers utilizing SystemObjects. The SystemObject manager can be part of a development library, or made part of an operating system.

By treating each download packet as an object that can be managed by the SystemObject manager, the memory use of a large number of download items can be more efficiently managed.

Figure 19:
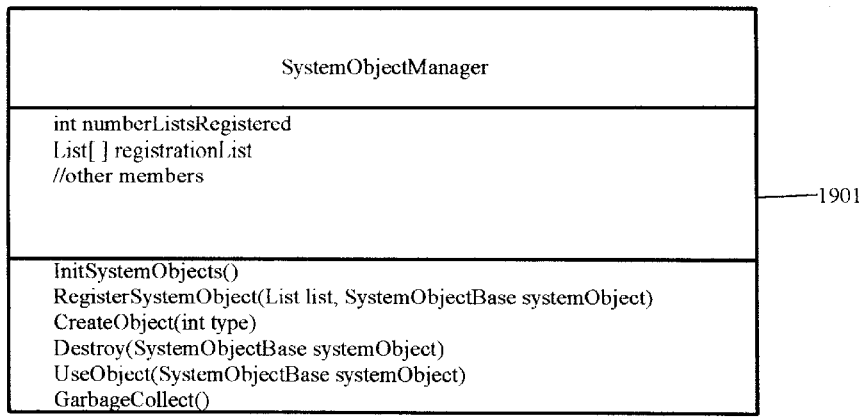
FIG. 19 is a class diagram for an object management system, referred to herein as a SystemObjects manager.
Figure 22:
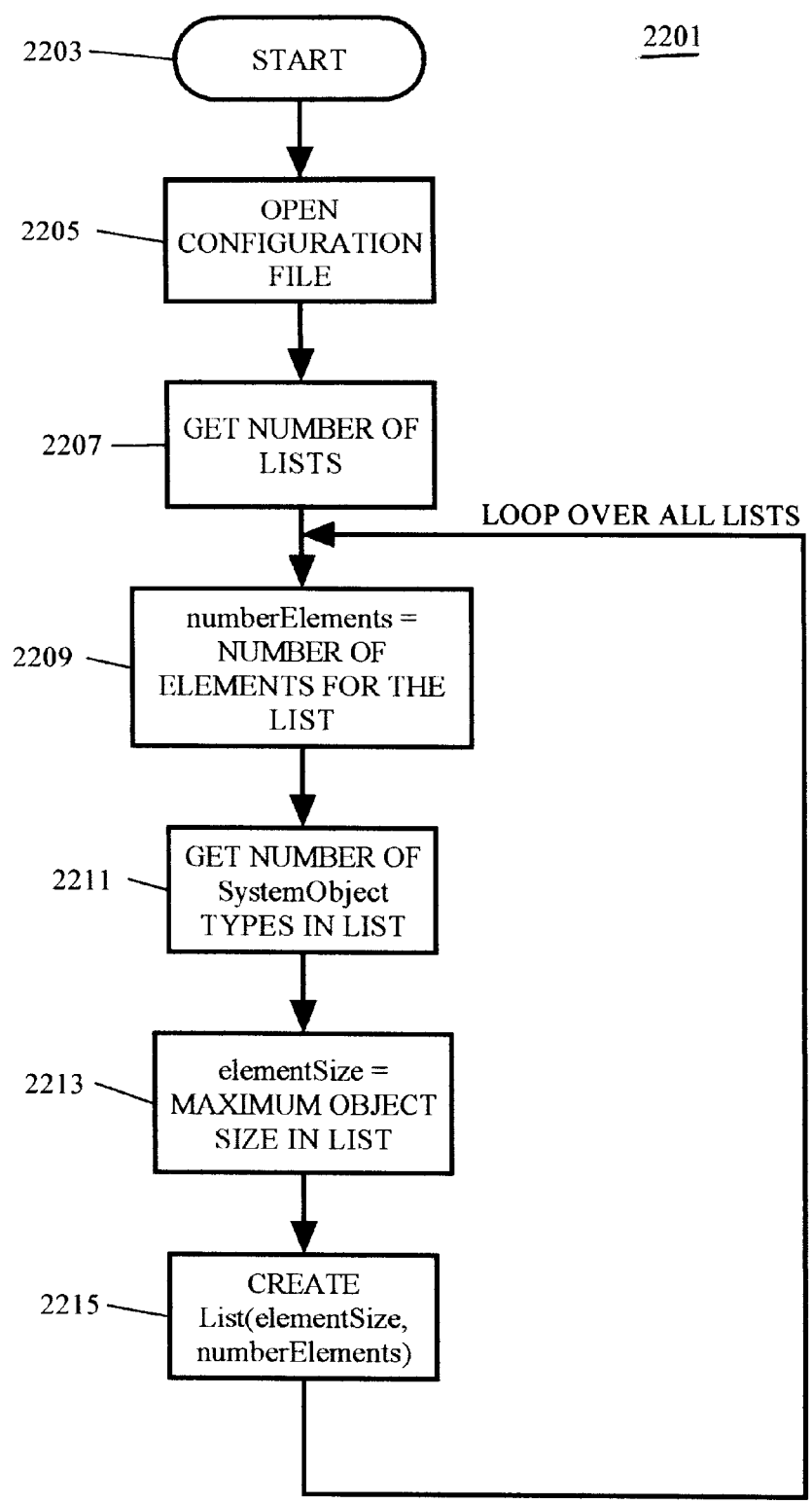
FIG. 22 is a flow diagram of processes for allocating memory to SystemObjects.
Figure 23:
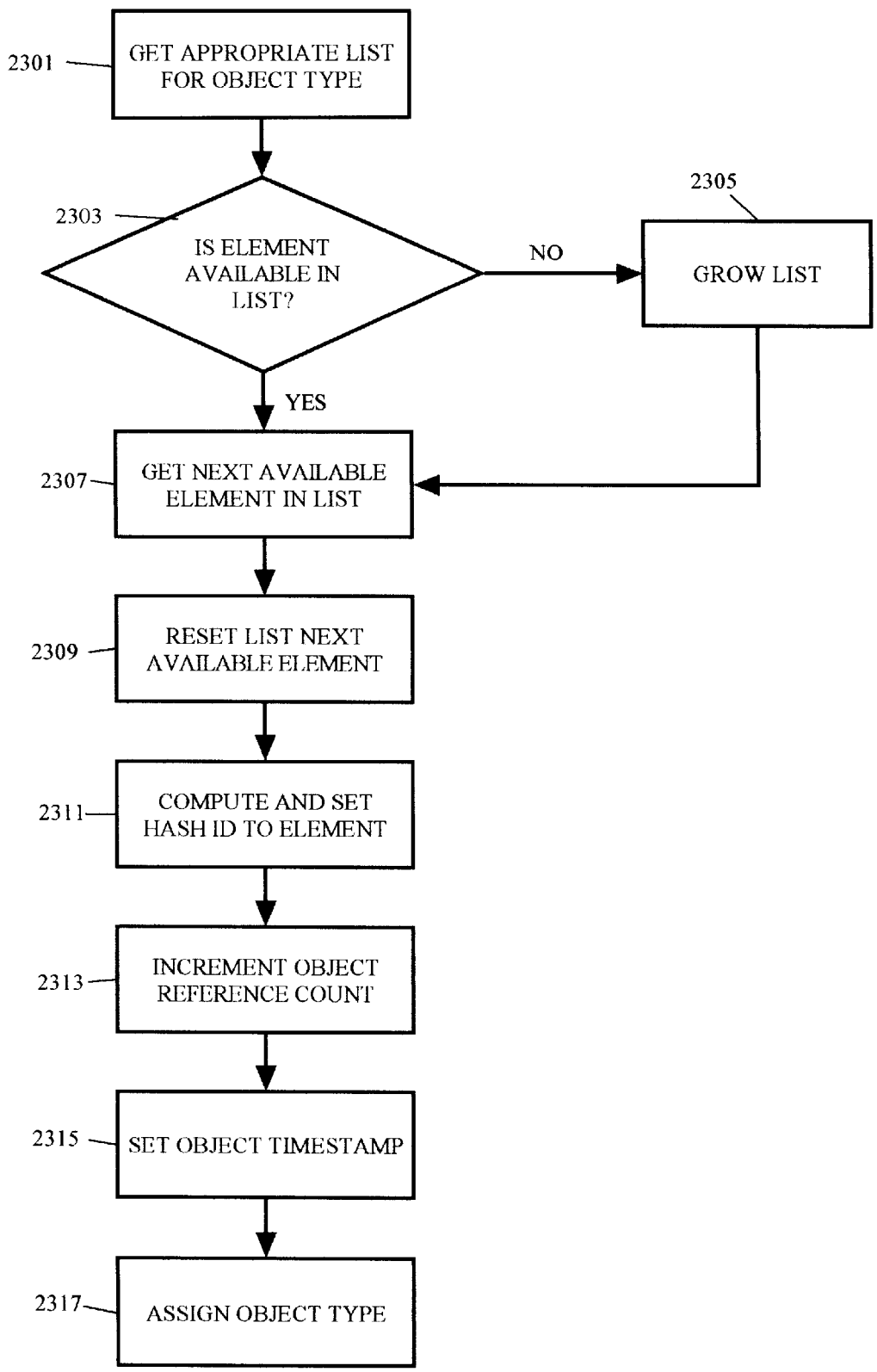
FIG. 23 is a flow diagram of processes for creating SystemObjects in the allocated memory.

Referring now to FIG. 19, the SystemObject manager 511 (FIG. 5) is implemented as one or more classes. For purposes of illustration, a single class diagram 1901 is used to explain the SystemObject manager. The SystemObject manager has attributes with which to track the number List objects that it manages and the identity of each List object. "numberListsRegistered" is an attribute that stores a value for the number of lists that are registered with the particular instance of the SystemObject manager. "List[] registrationList" is a list of classes of objects that will be managed by the SystemObject Manager. Such classes are "registered" with the SystemObject manager. For example, these classes would include, in the preferred embodiment, the DownloadItem class or classes. The SystemObject manager can be used to manage objects of other classes in an application or other software component running on the server, including the download manager. The SystemObject Manager also has several methods. "InitSystemObject" is a method called to pre-allocate the memory elements for each class registered with the SystemObjects manager. The processes of this method are illustrated in FIG. 22. "RegisterSystemObject" calls a method that adds a class that will be managed by the SystemObject manager. "CreateObject" calls a method to create an instance of a particular type of object from an available SystemObject. Processes for this method are schematically illustrated in FIG. 23. "Destroy" is a method by which an object of a particular type is destroyed and the SystemObject from which it was created is destroyed. These processes are schematically illustrated by FIG. 26. "GarbageCollect" invokes a method for carrying out the processes schematically illustrated in FIG. 25.

Referring to FIG. 20, the SystemObjectBase class 1801 has several data attributes. These attributes are, thus, found in each object class registered with the SystemObjects manager. "virtualFunctionTable" is a pointer to the object's virtual function table. "objectType" stores a character string that can identify the object's type. This string could also be used as a pointer or reference to a virtual function table for its methods, depending on the specific implementation. "hashID" is a unique identifier for the object. "timestamp" stores a time stamp. "referenceCount" stores the number of references to the object. "nextAvailableElement" is a pointer or reference to the next available SystemObject. "size" is a value identifying the size of the SystemObject. The SystemObjectBase class serves a root class for all other objects that will be managed by the SystemObject manager 511 (FIG. 5). "DeveloperSystemObject" is an example of a subclass, to which a developer has added certain attributes and methods specific to the developer's application. Similarly, classes used in the implementation of download packet objects herein, namely the DownloadItem class, are preferably derived from the SystemObjectBase class 1801 (FIG. 20). However, it is not necessary that it actually inherit from this base class if it otherwise possesses the necessary attributes and behavior for being created from a SystemObject and managed by the SystemObject Manager.

Referring to FIG. 21, List class 2101 includes the following attributes. "nextAvailableElement" is a pointer or reference to a next available memory element that has been allocated for use as a SystemObject of the type managed by a particular instance of the List. "beginlocation" is a pointer or reference to the location of the beginning element in the list of memory elements managed by a particular instance of the List class. "elementSize" is the size in, for example, bytes of each memory element. "numberElements" is the number of member elements managed by a particular instance of List. "growBySize" is a value indicating the number of memory elements that will be added to the list each time more memory is allocated. The methods of the List class include "List," "getElement," "setElement" and "freeElement." The method List actually creates the list of memory elements. The method getElement obtains the value of the attribute nextAvailableElement. The method setElement carries out processes for turning a SystemObject into an object of a particular type by, for example, setting the object type and hash identification code to serve as a handle to the object. The method "freeElement" releases a particular SystemObject from use as a specific type of object so that it will be accessible with a "getElement" call.

Referring now to FIG. 22, SystemObject manager 511 (FIG. 5) undertakes memory allocation process 2201 upon activation at step 2203. First a configuration file is opened at step 2205. This configuration file provides basic information for initially allocating memory allocation and creating SystemObjects. For each List to be created, steps 2209, 2211, 2213 and 2215 are undertaken. At step 2209, the attribute "numberElements" is set equal to the number of elements specified for the List. At step 2211 the object types to be managed by the List are obtained. "elementSize" is set equal at step 2213 to the maximum size of the object of types managed by the list. And, at step 2215, the memory is allocated for the elements, and a basic data structure of the SystemObjectBase is imposed in order to have use of certain of its attributes to store data in each of the memory elements for facilitating management of the memory elements. These attributes, in the preferred embodiment, include some or all of those of the SystemObjectBase 1801 (FIG. 20): the virtual function table pointer, object type, time stamp, reference count and size attributes.

FIG. 23 illustrates processes involved in creating an object of a specific type from a SystemObject. At step 2301, the SystemObject manager gets the List object with which the object's class is registered. Since a SystemObject is, at this stage, an element of memory set aside for creation of one or more specific types of objects, the following process will be described in reference to memory elements. If, as indicated by steps 2303 and 2305, a pre-allocated memory element is not available, the List is "grown" by allocating additional memory elements to the List. At step 2307, a pointer or reference to the next element in the list available for use as an object is obtained from the List object and is stored as the new value for nextAvailableElement. A new reference or pointer is calculated and stored for the nextAvailableElement at step 2309. The data structure of the object type is then imposed on the element and the data values set in a series of processes during the following steps. At step 2311, a hash code is computed and stored as hashID. The hashID is used as an identifier for the object, and is also maintained in a hash table for looking up a pointer or reference to the object. At step 2313 a count of the number of times the object is referenced is incremented by one. It is stored in the variable referenceCount. The object's time stamp is set at step 2315 and the objectType attribute is set at step 2317.

Figure 24:
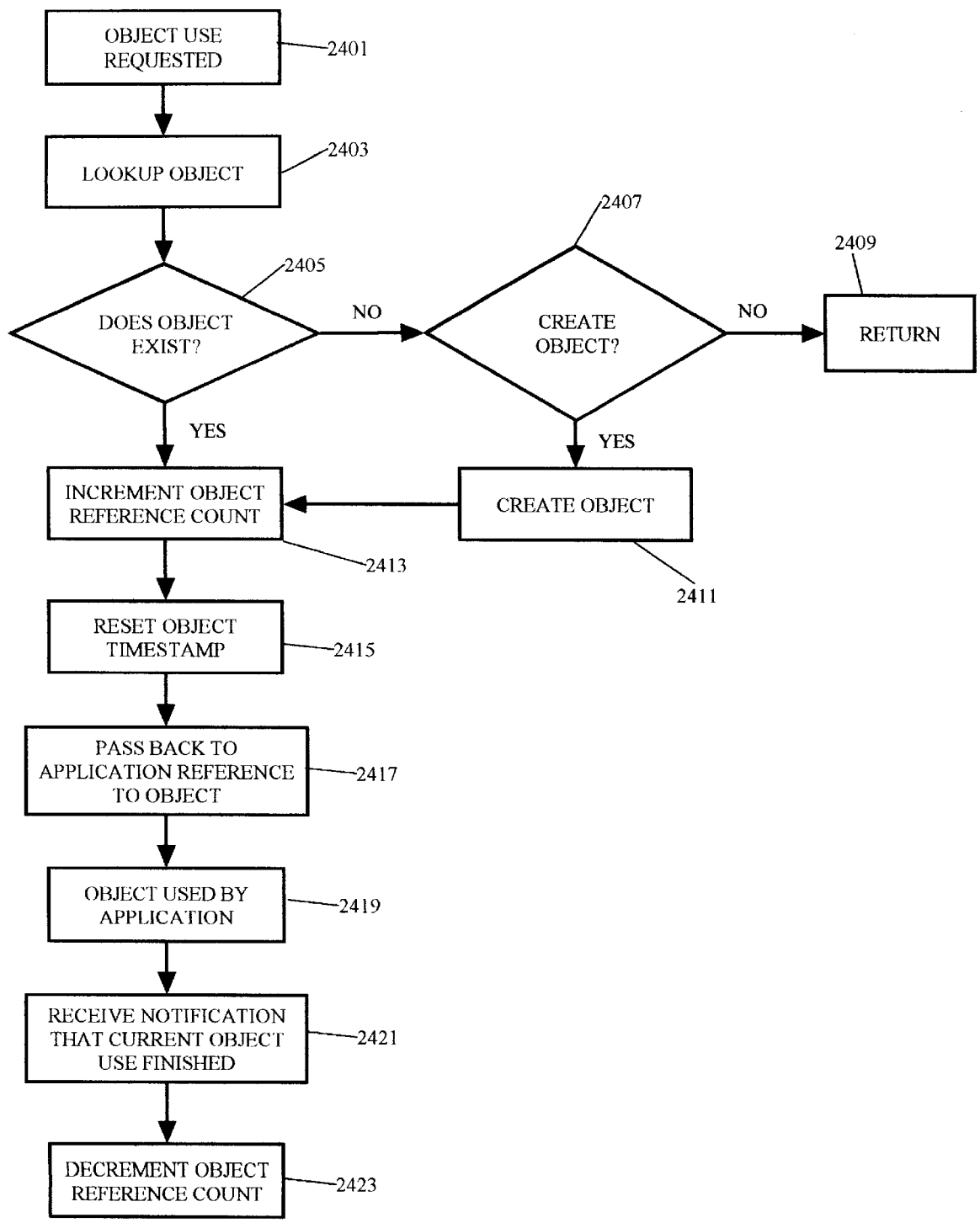
FIG. 24 is a flow diagram of processes for an application program to use SystemObjects as an object created by the application.

Referring now to FIG. 24, each time an object that is managed by, or registered with, the SystemObject manager is used, such as by reference or invocation of a method on the SystemObject, a request to use the object is made at step 2401 by passing a reference in the form of the hash ID. The hash ID is looked up in a hash table. If it is determined at step 2405 that an object with that hash ID does not exist, the process will determine whether it should create a new object at step 2407. A programmer of the class seeking use of an object could choose not to create additional objects based on any number of criteria. If an object does not exist for the hash ID, an exception is returned and the process returns at step 2409 to the beginning. If a new object is permitted to be created, it is created at step 2411 using the process described in reference to FIG. 23. Once the object is created at step 2411, or it is determined that one exists for use at step 2405, its reference count is incremented at step 2413 and its time stamp is reset at step 2415. These parameters are used for garbage collection purposes, as explained in connection with FIG. 25. A reference back to the object is, at step 2417, passed back to the method or process making the request. The object is thereafter used at step 2419 by the method or program requesting use. Once the method or program finishes using or referencing the object, it is required to pass a message at step 2421 that decreases the reference count for that object at step 2423. Multiple methods or programs could seek to use the object by obtaining a reference to it.

Figure 25:
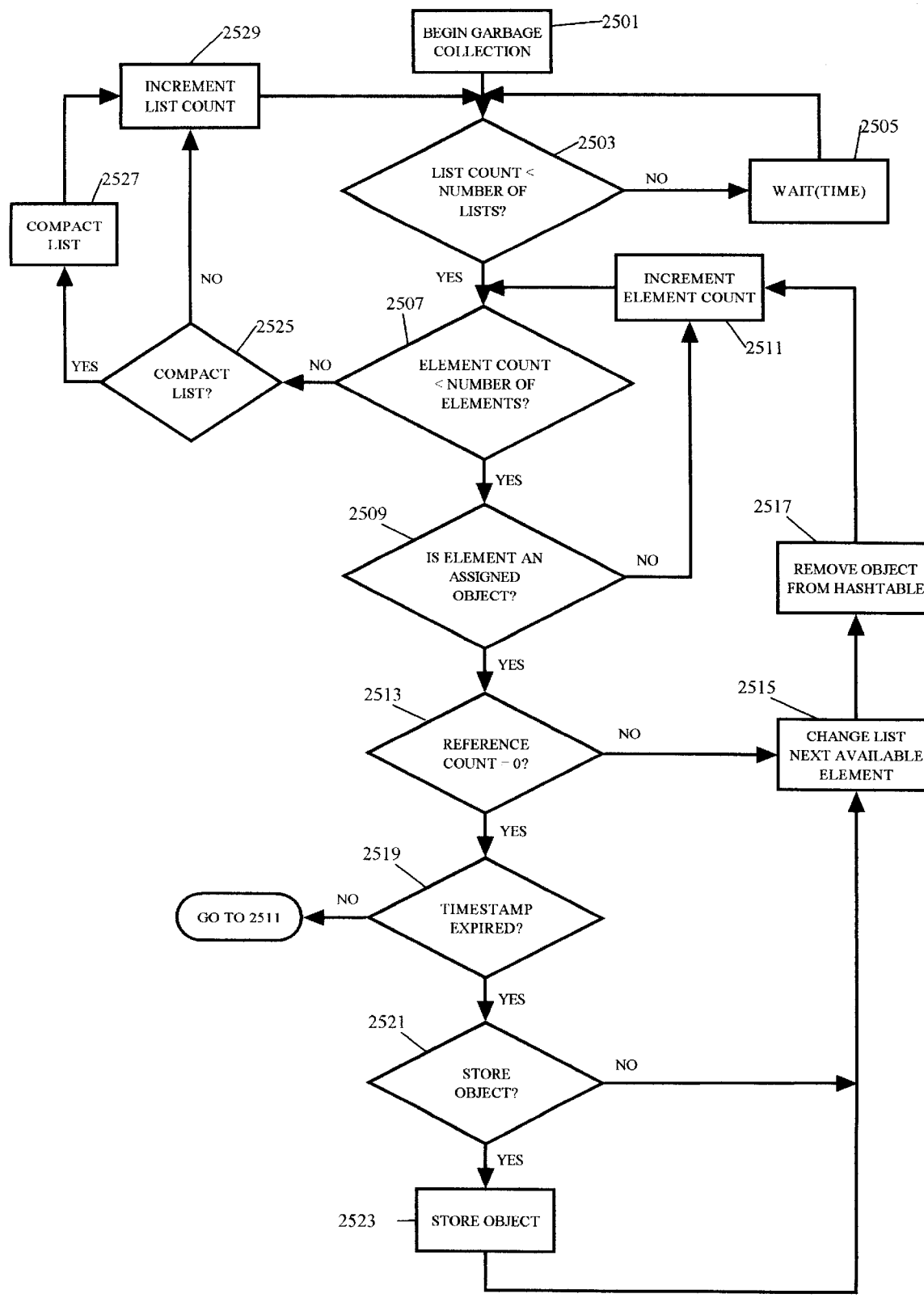
FIG. 25 is a flow diagram of processes for reclaiming SystemObjects no longer being used.
Figure 26:
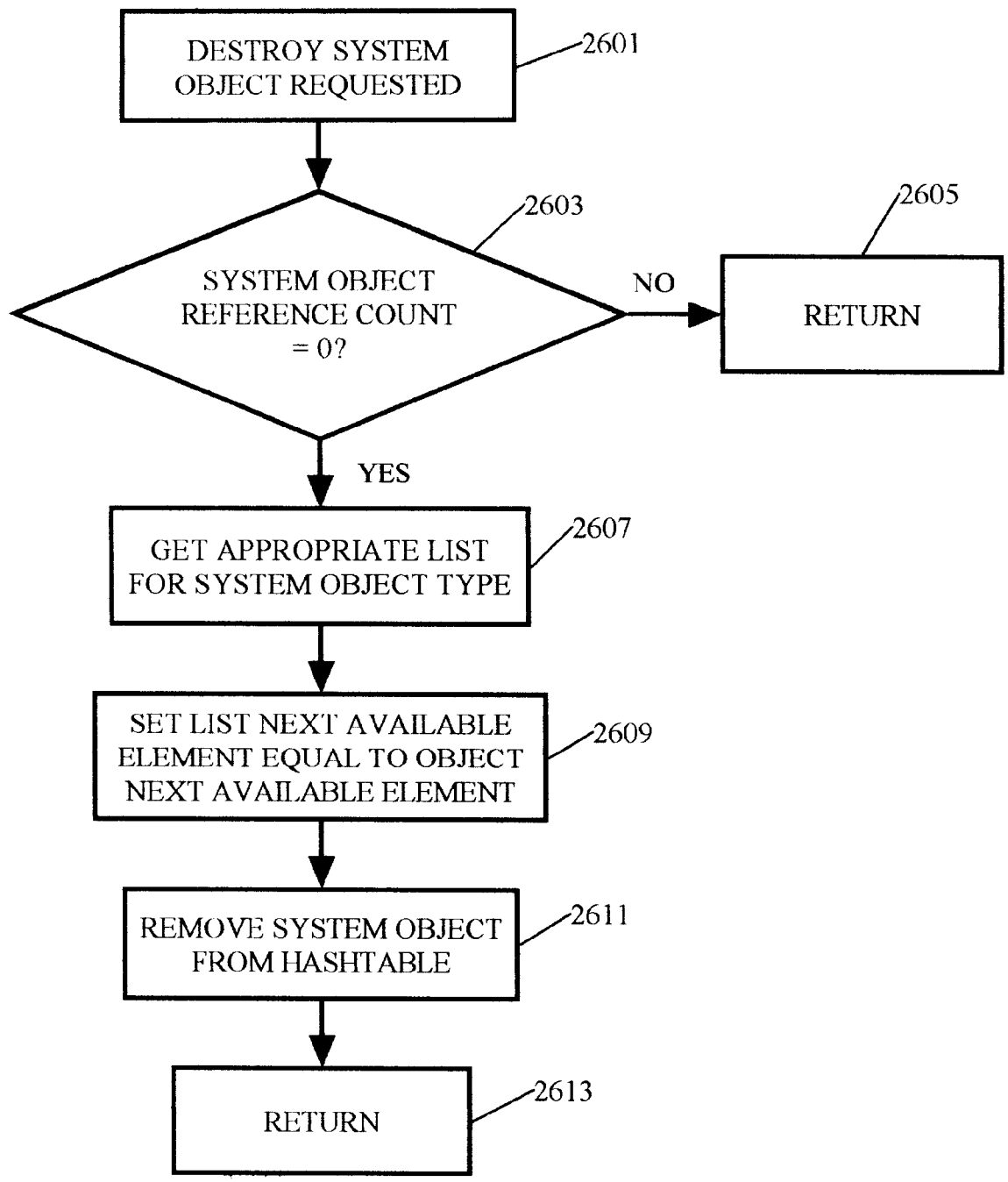
FIG. 26 is a flow diagram of processes for destroying SystemObjects.

Referring to FIG. 25, in order to free memory, a garbage collection routine commences periodically to "destroy" specific objects that are no longer being used or referenced, or to store them if they have not been used for some period of time. The memory elements used by these objects are made available for reuse. Garbage collection begins at step 2501, and loops for each list of memory elements as indicated by decision step 2503. Once garbage collection finishes for all the lists of memory elements, the garbage collection routine waits at step 2505 for some predetermined period of time before commencing again. The waiting period can depend on any number of conditions or factors. Similarly, the routine loops, as indicated by decision step 2507, for each memory element in a list.

At step 2509, the routine determines whether the element has been assigned an object. If no, the routine returns to step 2511 to increment the loop counter to start the garbage collection routine for the next element, beginning again with the determination at step 2509. If an element is assigned to an object, the routine next checks to see if the reference count for the object is equal to zero. If so, the routine proceeds to steps 2515 and 2517 where the object is "destroyed." At step 2515, the routine resets the attribute in the list that tracks a reference or point to the next available element in the list, namely nextAvailableElement, to the current element if its reference is less than its current value. The object is removed from the hash table at 2517 before the routine loops back to decision step 2509 to start again. If the element has a non-zero reference count at decision step 2513, the time stamp is checked to determine at step 2519 whether it has "expired." In other words, if the period since that last time use was requested for the object has exceeded some predetermined time, the routine decides at step 2521 whether or not to store the object based on some criteria, such as its type. If the object is to be stored, it is first copied at step 2523 into some file in storage. Whether or not it is stored, an object whose timestamp has expired is destroyed at steps 2515 and 2517 before the routine loops back to examine the next element in the list.

Once all the elements of a list are examined, the routine determines whether the list is to be compacted at step 2525. If so, it compacts the list at step 2527 before looping back step 2529 to increment the list loop count. Otherwise it loops directly back to the next list. A compacted list is one in which the remaining objects occupy consecutive memory elements, and thus also consecutive positions in the list.

Finally, in reference to FIG. 26, should the SystemObject manager 511 receive a request to destroy an object of a class registered with it, at step 2601, it first determines at step 2603 whether the reference count for that object is equal to zero. If not, an exception is returned and the process returns or ends at step 2605. If the reference count is zero, then the list object that manages that particular type of object is obtained at step 2607, such as by obtaining a reference to the List object managing that list. At step 2609, the attribute in the list that tracks the next available memory element, namely nextAvailableElement, is set equal to the value stored in that object's next available element attribute. The object is then removed from the hash table at step 2617 and the process ends and returns to the beginning at step 2613.

The foregoing description is of a preferred embodiment of the invention, in a particular environment of use, and is intended as but one example of the invention as defined by the appended claims. The programming implementation of the invention described herein may differ from other implementations of the invention as a consequence of differences in programming languages, preferences of programmers and the accommodation of needs of specific application programs. Furthermore, some components or processes described herein as being implemented in an object-oriented manner could be, instead, implemented using other types of programming techniques without departing from the principals of the invention as claimed. For example, a single class may be implemented as multiple classes, and vice versa.

What is claimed is:

1. A method for concurrently downloading a large item to a plurality of users comprising:

storing an item to be downloaded as a plurality of packets, each packet including a segment of the item and an index indicating the position of the segment within the item;

maintaining for each of a plurality of users a separate list of packets to be sent to the user; and sending to each of the plurality of users the packets in their respective lists of packets.

2. The method of claim 1 further comprising removing from the list of each of the plurality of users packets that have been sent to the respective user.

3. The method of claim 1 further comprising:

transmitting to each of the plurality of users information on the number of packets in the item;

receiving from each of the plurality of users indications of which, if any, of the packets have not been received by the user after such packets have been sent to the user; and adding the packets that have not been received to the respective user's list.

4. The method of claim 1 wherein each of the plurality of packets is stored as an object.

5. The method of claim 1 further comprising allocating a plurality of memory elements and creating in each memory element an object storing a separate one of the plurality of packets.

6. The method of claim 1 further comprising allocating a predetermined number of elements of memory for use by objects of a download packet class, prior to use of the memory by an object of the class; and wherein storing an item to be downloaded includes, obtaining a plurality of free memory elements to create objects that are instances of the download class; and storing in each of the plurality of the free memory elements a different segment of the item and an index for that segment.

7. The method of claim 7 further comprising storing information on the usage of each of the plurality of memory elements as an object.

8. The method of claim 8, wherein each object stored in a memory element further includes the information on the usage of the memory element.

9. The method of claim 8 further including storing additional information indicating the number of references to the object.

10. The method of claim 10 further including periodically checking the number of references to the object and, if less than one, indicating that the memory element occupied by the object is free.

11. A method of concurrently downloading an item, over one or more packet switched networks, to a plurality of users comprising:

storing an item to be downloaded as a plurality of packets, each packet including a segment of the item and an index indicating the position of the segment within the item;

maintaining for each of a plurality of users a separate list of packets to be sent to the user; and for each of the plurality of users sending, in turn, one or more of the plurality of packets in that user's list of packets.

12. The method of claim 11 wherein the step of sending further includes adding a network communications header to each packet and transmitting the packet.

13. A method for concurrently downloading an item to a plurality of recipients, comprising:

dividing an item to be downloaded into a plurality of segments, wherein each of said plurality of segments includes a portion of said item;

adding a header to each of said plurality of segments, thereby producing a plurality of packets, wherein said header includes an index indicating the position of said segment of said item within said item;

storing a copy of each of the plurality of packets;

maintaining for the plurality of recipients listings containing references to those of the plurality of packets to be transmitted to each of the plurality of recipients;

selecting a first recipient of the plurality of recipients and causing to be transmitted a copy of one or more of the packets that are referenced in the listings for transmission to the first recipient; and selecting a second recipient of the plurality of recipients and causing to be transmitted a copy of one or more of the packets that are referenced in the listings for transmission to the second recipient.

14. The method of claim 13, further comprising:

adding a network communications header to each packet prior to sending said packet.

15. The method of claim 13, further comprising:

for each packet sent to a particular one of said plurality of recipients, removing from the listings reference to said sent packet.

16. The method of claim 13, further comprising:

receiving from the first recipient a communication indicating which of the transmitted packets were not received by the recipient after such packets have been transmitted to the recipient; and adding references for each of said packets that have not been received to the listings for transmission to the first recipient.

17. The method of claim 13, wherein each of the plurality of packets is stored as an object.

18. The method of claim 13, further comprising allocating a plurality of memory elements and creating in each allocated memory element an object storing a separate one of said plurality of packaged packets.

19. The method of claim 13, further comprising allocating a predetermined number of elements of memory for use by objects of a download packet class, prior to use of the memory by an object of the class; and wherein storing an item to be downloaded includes, obtaining a plurality of free memory elements to create objects that are instances of said download class; and storing in each of the plurality of free elements a different one of the plurality of packets.

20. A computer readable medium storing instructions that, when read by a computer, cause the computer to perform a method for concurrently downloading an item to a plurality of recipients, the method comprising:

dividing an item to be downloaded into a plurality of segments, wherein each of said plurality of segments includes a portion of said item;

adding a header to each of said plurality of segments, thereby producing a plurality of packets, wherein said header includes an index indicating the position of said segment of said item within said item;

storing a copy of each of the plurality of packets;

maintaining for the plurality of recipients listings containing references to the plurality of packets to be transmitted to each of the plurality of recipients;

selecting a first recipient of the plurality of recipients and causing to be transmitted a copy of one or more of the packets that are referenced in the listings for transmission to the first recipient; and selecting a second recipient of the plurality of recipients and causing to be transmitted a copy of one or more of the packets that are referenced in the listings for transmission to the second recipient.

21. The computer readable medium of claim 20, wherein the method further comprises:

adding a network communications header to each packaged packet prior to sending said packaged packet.

22. The computer readable medium of claim 20, wherein the method further comprises, for each packet sent to a particular one of said plurality of recipients, removing from the listings reference to said sent packet.

23. The computer readable medium of claim 20, wherein the method further comprises:

receiving from the first recipient a communication indicating which of the transmitted packets were not received by the recipient after such packets have been transmitted to the recipient; and adding references for each of said packets that have not been received to the listings for transmission to the first recipient.

24. The computer readable medium of claim 20, wherein each of the plurality of packets is stored as an object.

25. The computer readable medium of claim 20, wherein the method further comprises allocating a plurality of memory elements and creating in each allocated memory element an object storing a separate one of said plurality of packaged packets.

26. The computer readable medium of claim 20, wherein the method further comprises allocating a predetermined number of elements of memory for use by objects of a download packet class, prior to use of the memory by an object of the class; and wherein storing an item to be downloaded includes, obtaining a plurality of free memory elements to create objects that are instances of said download class; and storing in each of the plurality of free elements a different one of the plurality of packets.

* * * * *